(12) United States Patent
Kobayashi

(10) Patent No.: US 11,187,716 B2
(45) Date of Patent: Nov. 30, 2021

(54) RESAMPLING CIRCUIT, PHYSICAL QUANTITY SENSOR UNIT, INERTIAL MEASUREMENT UNIT, AND STRUCTURE MONITORING DEVICE

(71) Applicant: Seiko Epson Corporation, Tokyo (JP)

(72) Inventor: Yoshihiro Kobayashi, Komagane (JP)

(73) Assignee: Seiko Epson Corporation

( * ) Notice: Subject to any disclaimer, the term of this patent is extended or adjusted under 35 U.S.C. 154(b) by 166 days.

(21) Appl. No.: 16/395,525

(22) Filed: Apr. 26, 2019

(65) Prior Publication Data

US 2019/0331708 A1   Oct. 31, 2019

(30) Foreign Application Priority Data

Apr. 27, 2018   (JP) .............................. JP2018-086188

(51) Int. Cl.
*G01P 15/08* (2006.01)
*G06F 1/08* (2006.01)
*G01C 19/5776* (2012.01)
*G01P 15/097* (2006.01)

(52) U.S. Cl.
CPC ...... *G01P 15/0802* (2013.01); *G01C 19/5776* (2013.01); *G01P 15/097* (2013.01); *G06F 1/08* (2013.01)

(58) Field of Classification Search
CPC ............... G01P 15/0802; G01P 15/097; G01C 19/5776; G06F 1/08
USPC ...................................................... 73/514.3
See application file for complete search history.

(56) References Cited

U.S. PATENT DOCUMENTS

| | | | |
|---|---|---|---|
| 6,892,576 B2 | 5/2005 | Samuels et al. | |
| 7,956,621 B2 | 6/2011 | Hollocher et al. | |
| 8,472,270 B2 | 6/2013 | Samuels et al. | |
| 8,665,627 B2 | 3/2014 | Lee et al. | |
| 8,917,099 B2 | 12/2014 | Hollocher et al. | |
| 9,041,462 B2 | 5/2015 | Genik | |
| 9,297,825 B2 | 3/2016 | Zhang et al. | |
| 2012/0068866 A1 | 3/2012 | Robinson | |
| 2013/0101068 A1* | 4/2013 | Mombers | H03L 7/18 375/316 |
| 2020/0136794 A1 | 4/2020 | Andrade Alfonseca et al. | |

FOREIGN PATENT DOCUMENTS

| | | |
|---|---|---|
| JP | H05-091287 A | 4/1993 |
| JP | 2018-092392 A | 6/2018 |
| JP | 2018-141659 A | 9/2018 |

OTHER PUBLICATIONS

U.S. Appl. No. 16/395,577, filed Apr. 26, 2019, Yoshihiro Kobayashi.

* cited by examiner

*Primary Examiner* — Tarun Sinha
(74) *Attorney, Agent, or Firm* — Harness, Dickey & Pierce, P.L.C.

(57) ABSTRACT

A resampling circuit converts first data updated synchronously with a first clock signal into second data updated synchronously with a second clock signal asynchronous with the first clock signal and outputs the second data. The resampling circuit calculates and outputs the second data with a time resolution of a third clock signal having a higher frequency than the first clock signal and the second clock signal, based on the first data.

18 Claims, 15 Drawing Sheets

RESAMPLING CIRCUIT, PHYSICAL QUANTITY SENSOR UNIT, INERTIAL MEASUREMENT UNIT, AND STRUCTURE MONITORING DEVICE

The present application is based on and claims priority from JP Application Serial Number 2018-086188, filed Apr. 27, 2018, the disclosure of which is hereby incorporated by reference herein in its entirety.

BACKGROUND

1. Technical Field

The present disclosure relates to a resampling circuit, a physical quantity sensor unit, an inertial measurement unit, and a structure monitoring device.

2. Related Art

An inertial measurement unit (IMU) or a physical quantity sensor unit which measures a certain physical quantity such as acceleration or angular velocity converts a signal corresponding to the magnitude of a measurement target physical quantity from analog to digital, then performs various kinds of signal processing such as correction and conversion to generate measurement data, and outputs the measurement data to an arithmetic processing device (host). Generally, the measurement data is outputted synchronously with an external trigger signal supplied from the arithmetic processing device asynchronously with the sampling rate of A/D conversion, and A/D conversion is carried out at a higher frequency than the output rate of the measurement data. Therefore, the IMU or physical quantity sensor unit is provided with a resampling circuit which converts the sampling rate at the time of A/D conversion to the output rate of the measurement data.

JP-A-5-91287 discloses a technique of converting a sampling rate by performing interpolation with the lowest common multiple of two sampling rates, then smoothing via a digital filter, and decimating the result.

However, in the technique disclosed in JP-A-5-91287, when two sampling rates are asynchronous, a periodic noise may be generated in output data due to a periodic resampling error.

SUMMARY

A resampling circuit according to an aspect of the present disclosure is a resampling circuit that converts first data updated synchronously with a first clock signal into second data updated synchronously with a second clock signal asynchronous with the first clock signal and outputs the second data. The resampling circuit calculates and outputs the second data with a time resolution of a third clock signal having a higher frequency than the first clock signal and the second clock signal, based on the first data.

In the resampling circuit according to the aspect of the present disclosure, the second data may be a representative value calculated based on the first data in a period of the second clock signal.

In the resampling circuit according to the aspect of the present disclosure, a value of the first data may be measured with the third clock signal. The measured value of the first data may be accumulated in the period of the second clock signal. The period of the second clock signal may be measured with the third clock signal. The accumulated value of the first data may be divided by the measured period of the second clock signal to calculate the representative value of the first data.

In the resampling circuit according to the aspect of the present disclosure, a value of the first data may be measured with the second clock signal. Based on the measured value of the first data as a reference value, a difference between the reference value and the value of the first data may be measured with the third clock signal. The measured difference may be accumulated in the period of the second clock signal. The period of the second clock signal may be measured with the third clock signal. The accumulated difference may be divided by the measured period of the second clock signal to calculate an average value of the difference. The reference value and the average value of the difference may be added together to calculate the representative value of the first data.

In the resampling circuit according to the aspect of the present disclosure, a value of the first data may be measured with the third clock signal. Based on a value of the second data as a reference value, a difference between the reference value and the measured value of the first data may be measured with the third clock signal. The measured difference may be accumulated in the period of the second clock signal. The period of the second clock signal may be measured with the third clock signal. The accumulated difference may be divided by the measured period of the second clock signal to calculate an average value of the difference. The reference value and the average value of the difference may be added together to calculate the representative value of the first data.

In the resampling circuit according to the aspect of the present disclosure, a span from an edge of the second clock signal to an edge of the first clock signal, a span from an edge of the first clock signal to a next edge, and a span from an edge of the first clock signal to an edge of the second clock signal may be measured with the third clock signal. The measured span may be accumulated in the period of the second clock signal. Based on a value of the second data as a reference value, a difference between the reference value and a value of the first data may be calculated. The measured span and the calculated difference may be multiplied together to calculate an accumulated value of the difference. The accumulated value of the difference may be accumulated in the period of the second clock signal. The accumulated value of the difference thus accumulated may be divided by the accumulated span to calculate an average value of the difference. The reference value and the average value of the difference may be added together to calculate the representative value of the first data.

In the resampling circuit according to the aspect of the present disclosure, a span from an edge of the second clock signal to an edge of the first clock signal, a span from an edge of the first clock signal to a next edge, and a span from an edge of the first clock signal to an edge of the second clock signal may be measured with the third clock signal. A period of the first clock signal may be measured with the third clock signal. A ratio between the measured span and the measured period of the first clock signal may be calculated. The calculated ratio may be accumulated in the period of the second clock signal. Based on a value of the second data as a reference value, a difference between the reference value and a value of the first data may be calculated. The calculated ratio and the difference may be multiplied together. The multiplied value of the ratio and the difference may be accumulated in the period of the second clock signal. The accumulated multiplied value may be divided by the accumulated ratio to calculate an average value of the difference. The reference value and the average value of the difference may be added together to calculate the representative value of the first data.

The resampling circuit according to the aspect of the present disclosure may have a function of initializing the representative value of the first data.

In the resampling circuit according to the aspect of the present disclosure, the representative value may be one of average value, median, and mode.

The resampling circuit according to the aspect of the present disclosure may include a low-pass filter which outputs the first data. A cutoff frequency of the low-pass filter may be lower than a Nyquist frequency of the second clock signal.

In the resampling circuit according to the aspect of the present disclosure, the first clock signal may be a sampling clock in A/D conversion.

In the resampling circuit according to the aspect of the present disclosure, the second clock signal may be a trigger signal inputted from outside to the resampling circuit.

A physical quantity sensor unit according to an aspect of the present disclosure includes: the resampling circuit of one of the foregoing configurations; and a physical quantity sensor.

In the physical quantity sensor unit according to the aspect of the present disclosure, the physical quantity sensor may detect at least one of acceleration and angular velocity.

An inertial measurement unit according to an aspect of the present disclosure includes: a physical quantity sensor which detects at least one of acceleration and angular velocity; a signal processing circuit which includes the resampling circuit of one of the foregoing configurations and processes a signal outputted from the physical quantity sensor; and a communication circuit which transmits inertial data resulting from the processing by the signal processing circuit to outside.

A structure monitoring device according to an aspect of the present disclosure includes: the physical quantity sensor unit of one of the foregoing configurations; a receiver which receives a detection signal from the physical quantity sensor unit installed on a structure; and a calculator which calculates an angle of inclination of the structure, based on a signal outputted from the receiver.

DESCRIPTION OF EXEMPLARY EMBODIMENTS

Embodiments of the present disclosure will now be described in detail with reference to the drawings. The embodiments described below should not unduly limit the content of the present disclosure described in the appended claims. Not all the elements described below are essential elements of the present disclosure.

1. Resampling Circuit

Hereinafter, each embodiment is described, taking, as an example, a resampling circuit which has an A/D-converted measurement target signal, converts digital data (hereinafter referred to as "AD data") updated synchronously with a sampling clock (hereinafter referred to as "AD clock") in the A/D conversion into measurement data updated synchronously with an externally inputted trigger signal (hereinafter referred to as "external trigger") asynchronous with the AD clock, and outputs the measurement data. The A/D conversion of the measurement target signal may be, for example, converting the voltage of the measurement target signal into digital data or converting the frequency of the measurement target signal into digital data. The resampling circuit converts the AD data into the measurement data, using a clock (hereinafter referred to as "high-frequency clock") having a higher frequency than the AD clock and the external trigger. In the description below, the external trigger and the AD clock are asynchronous with each other. The frequency of the AD clock is higher than the frequency of the external trigger. The frequency of the high-frequency clock is sufficiently higher than the frequency of the AD clock. The high-frequency clock may be synchronous or asynchronous with the AD clock or the external trigger.

The AD clock is an example of the "first clock signal" according to the present disclosure. The external trigger is an example of the "second clock signal" according to the present disclosure. The high-frequency clock is an example of the "third clock signal" according to the present disclosure. The AD data is an example of the "first data" according to the present disclosure. The measurement data is an example of the "second data" according to the present disclosure.

1-1. First Embodiment

Figure 1:
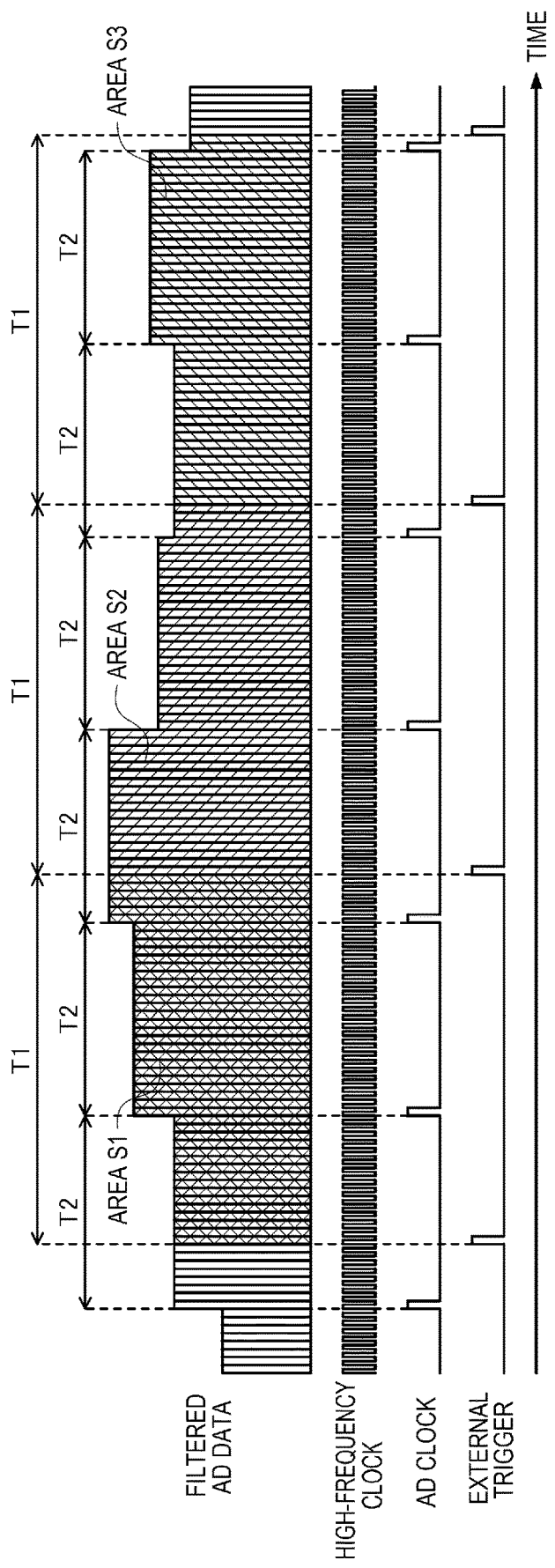
FIG. 1 illustrates an outline of processing in a resampling circuit according to a first embodiment.

FIG. 1 illustrates an outline of processing in a resampling circuit according to a first embodiment. As shown in FIG. 1, the resampling circuit of the first embodiment accumulates a value of AD data resulting from filtering inputted AD data, synchronously with a high-frequency clock for every period T1 of an external trigger, and thus calculates areas S1, S2, S3, . . . of the AD data for every period of the external trigger with the resolution of the high-frequency clock. The resampling circuit of the first embodiment then measures the time of one period T1 of the external trigger with the high-frequency clock, defines an average value of the AD data resulting from dividing the areas S1, S2, S3, . . . of the AD data by the measured time for every period T1 of the external trigger, as a resampled value, and outputs measurement data having the resampled value.

Figure 2:
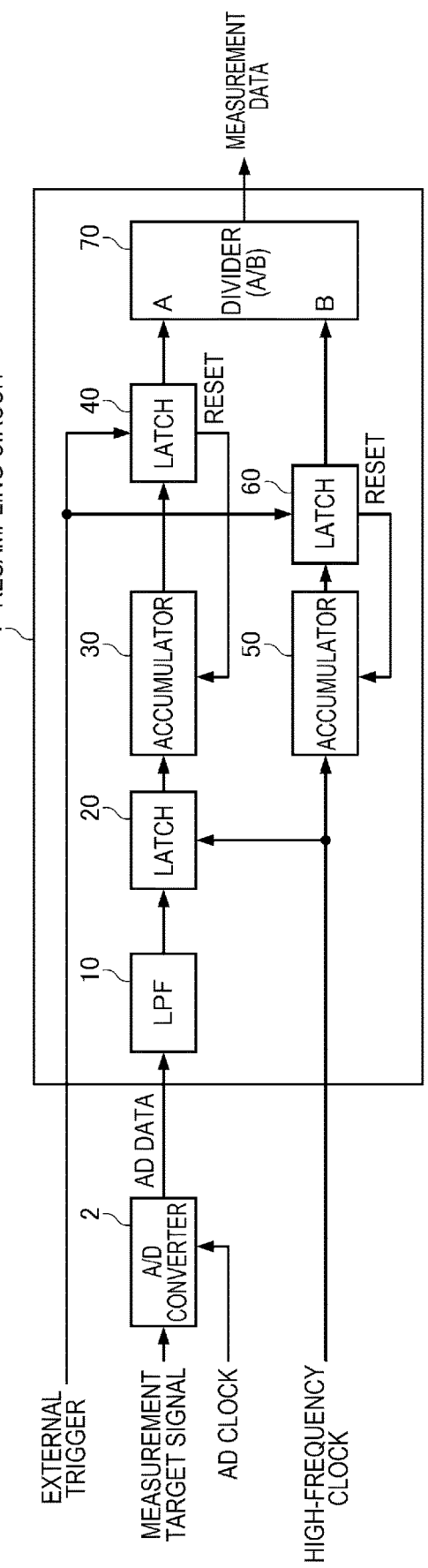
FIG. 2 shows an example of the configuration of the resampling circuit according to the first embodiment.

FIG. 2 shows an example of the configuration of the resampling circuit of the first embodiment. As shown in FIG. 2, a resampling circuit 1 of the first embodiment includes a low-pass filter (LPF) 10, a latch 20, an accumulator 30, a latch 40, an accumulator 50, a latch 60, and a divider 70.

To the low-pass filter (LPF) 10, AD data resulting from A/D-converting a measurement target signal by an A/D converter 2 outside the resampling circuit 1 is inputted. The low-pass filter 10 filters the AD data and thus damps a high-range noise. For example, the low-pass filter 10 is implemented by a digital filter such as a FIR (finite impulse response) filter or IIR (infinite impulse response) filter.

The latch 20 takes in and holds the AD data outputted from the low-pass filter 10 at every edge of the high-frequency clock. The edge of the high-frequency clock at which the latch 20 takes in the data may be a rising edge, a falling edge, or both a rising edge and a falling edge, according to need. For example, the latch 20 is implemented by a register made up of a predetermined number of D flip-flops.

The accumulator 30 accumulates the value of the data held by the latch 20 at every edge of the high-frequency clock, when a reset signal from the latch 40 is inactive (for example, low-level). The accumulator 30 initializes the accumulated value to zero when the reset signal from the latch 40 is active (for example, high-level). The edge of the high-frequency clock at which the accumulator 30 accumulates the value of the data may be the same as the edge of the high-frequency clock at which the latch 20 takes in the data. For example, the accumulator 30 includes an adder and a register, and is implemented by the adder adding the value of the data held by the latch 20 and the value of the data held in the register, and the register taking in and holding the value added by the adder at every edge of the high-frequency clock.

The latch 40 takes in and holds the value accumulated by the accumulator 30 at every edge of the external trigger, and also turns the reset signal active for a predetermined time and supplies the reset signal to the accumulator 30. The edge of the external trigger at which the latch 40 takes in the accumulated value may be a rising edge or a falling edge according to need. For example, the latch 40 includes a register made up of a predetermined number of D flip-flops. The value held by the latch 40 is equivalent to the areas S1, S2, S3, . . . of the AD data for every period of the external trigger, described with reference to FIG. 1.

The accumulator 50 accumulates the number of edges of the high-frequency clock when a reset signal from the latch 60 is inactive (for example, low-level). The accumulator 50 initializes the accumulated value to zero when the reset signal from the latch 60 is active (for example, high-level). The accumulator 50 may accumulate the number of rising edges of the high-frequency clock, the number of falling edges of the high-frequency clock, or the number of rising edges and falling edges of the high-frequency clock, according to need. For example, the accumulator 50 is implemented by a counter with a predetermined number of bits having a reset function.

The latch 60 takes in and holds the value accumulated by the accumulator 50 at every edge of the external trigger, and also turns the reset signal active for a predetermined time and supplies the reset signal to the accumulator 50. The edge of the external trigger at which the latch 60 takes in the accumulated value may be the same as the edge of the external trigger at which the latch 40 takes in the accumulated value. For example, the latch 60 includes a register made up of a predetermined number of D flip-flops. The value held by the latch 60 is equivalent to the time of one period T1 of the external trigger measured with the high-frequency clock, described with reference to FIG. 1.

The divider 70 divides the value held by the latch 40 by the value held by the latch 60. The value outputted from the divider 70 is equivalent to the average value of the AD data for every period T1 of the external trigger, calculated with the resolution of the high-frequency clock. The resampling circuit 1 defines the value outputted from the divider 70 as a resampled value and outputs measurement data having the resampled value.

Figure 3:
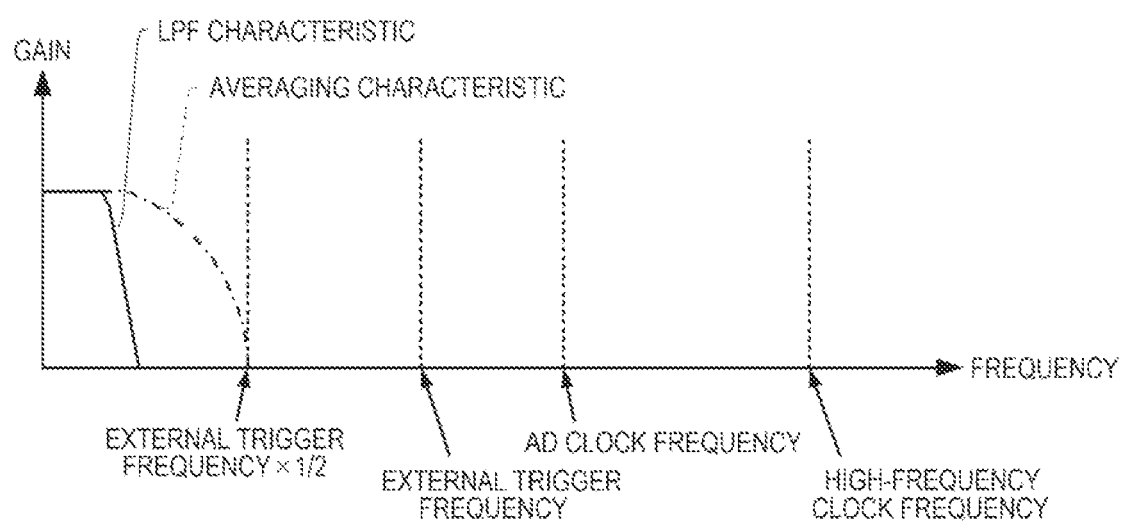
FIG. 3 shows an example of a characteristic of a low-pass filter and a characteristic of averaging.

FIG. 3 shows an example of a characteristic of the low-pass filter 10 and a characteristic of averaging in which the resampled value is calculated based on the AD data outputted from the low-pass filter 10. In FIG. 3, the horizontal axis represents frequency and the vertical axis represents gain. The characteristic (LPF characteristic) of the low-pass filter 10 is indicated by a solid line. The characteristic of averaging (averaging characteristic) is indicated by a chain-dashed line. As shown in FIG. 3, to reduce a folding noise in the frequency band of the averaged signal in the resampling based on the external trigger, the cutoff frequency of the low-pass filter 10 is set to be lower than half the frequency of the external trigger (Nyquist frequency). The pass range of the low-pass filter limits the frequency band of the measurement data outputted from the resampling circuit 1.

In the resampling circuit 1 of the first embodiment described above, the low-pass filter 10 filters AD data and outputs the filtered AD data. The latch 20 measures the value of the AD data outputted from the low-pass filter 10 with a high-frequency clock. The accumulator 30 and the latch 40 accumulate the value of the AD data measured by the latch 20, in the period of an external trigger. The accumulator 50 and the latch 60 measure the period of the external trigger with the high-frequency clock. The divider 70 then divides the value of the AD data accumulated by the accumulator 30 and the latch 40 by the period of the external trigger measured by the accumulator 50 and the latch 60 and calculates an average value as a representative value of the AD data.

In the related-art technique, for example, in the foregoing IMU or physical quantity sensor, when a clock signal for A/D conversion and an external trigger signal are asynchronous with each other, a periodic noise may be generated in output data due to a periodic resampling error, resulting in lower quality of measurement data.

In contrast, the resampling circuit 1 of the first embodiment having the foregoing configuration according to the present disclosure calculates and outputs measurement data with the time resolution of a high-frequency clock having a higher frequency than the AD clock and the external trigger, based on the AD data outputted from the low-pass filter 10. The measurement data is the average value of the AD data as a representative value calculated based on the AD data in the period of the external trigger. Thus, the resampling circuit 1 of the first embodiment, which asynchronously resamples the AD data in response to the external trigger, can reduce a periodic noise generated in the resampled measurement data.

In the resampling circuit 1 of the first embodiment, the AD clock having a higher frequency than the external trigger can form a filter and therefore the low-pass filter 10 having a high degree of freedom in filter shape limits the band of the measurement data. This reduces the constraint on the design of a band-limiting filter provided on the stage subsequent to the resampling circuit and can reduce the circuit area of the band-limiting filter. Thus, for example, making the pass range of the low-pass filter 10 equal to the pass range of the band-limiting filter to be provided on the stage subsequent to the resampling circuit enables omission of the band-limiting filter.

1-2. Second Embodiment

Figure 4:
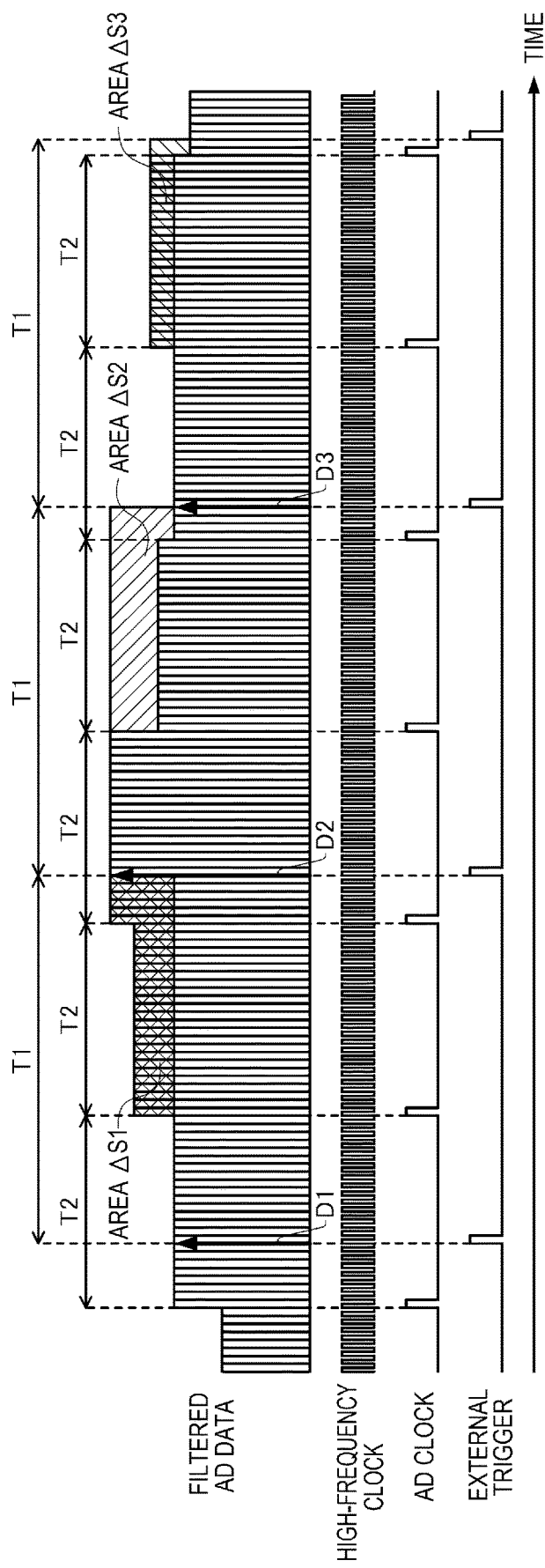
FIG. 4 illustrates an outline of processing in a resampling circuit according to a second embodiment.

FIG. 4 illustrates an outline of processing in a resampling circuit according to a second embodiment. As shown in FIG. 4, the resampling circuit of the second embodiment defines a value of AD data resulting from filtering AD data inputted at the timing of an external trigger, as reference values D1, D2, D3, . . . , accumulates a difference between the AD data resulting from filtering the inputted AD data and the reference value synchronously with a high-frequency clock for every period T1 of the external trigger, and thus calculates areas ΔS1, ΔS2, ΔS3, . . . of the difference for every period of the external trigger with the resolution of the high-frequency clock. The resampling circuit of the second embodiment then measures the time of one period T1 of the external trigger with the high-frequency clock, defines an average value of the AD data obtained by adding together the areas ΔS1, 4S2, 4S3, . . . of the difference divided by the measured time for every period T1 of the external trigger and the reference values D1, D2, D3, . . . , as a resampled value, and outputs measurement data having the resampled value.

Figure 5:
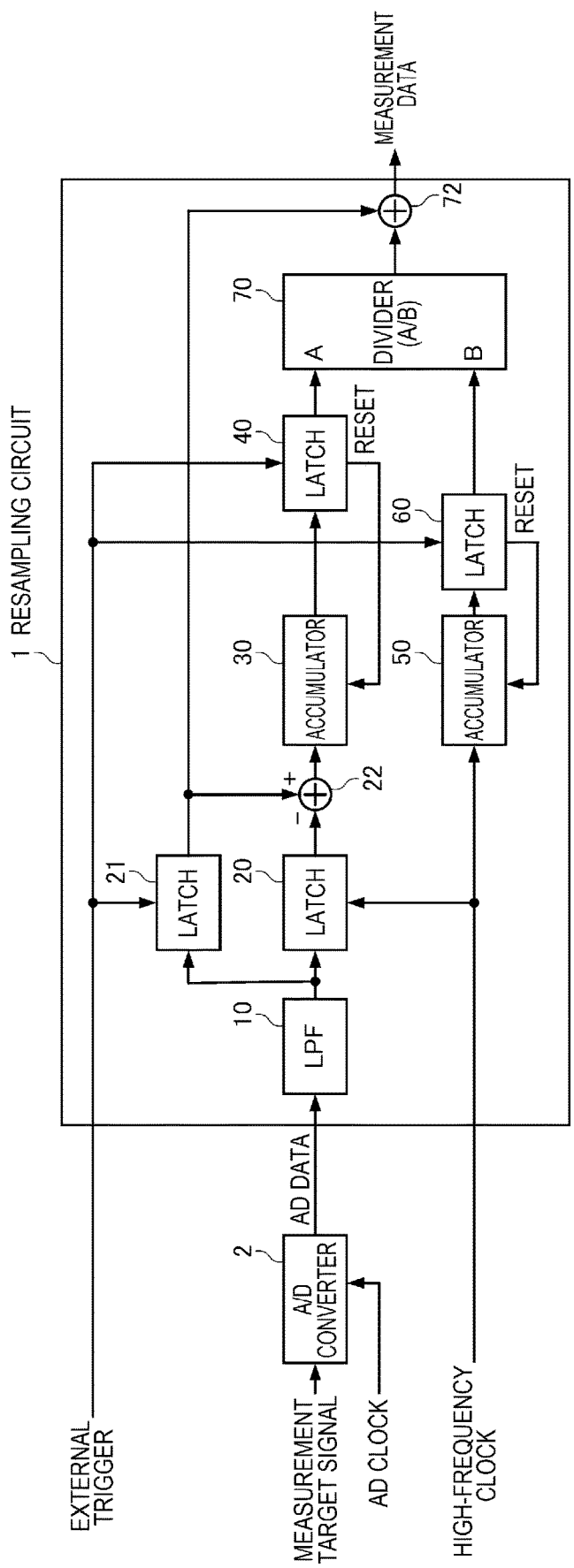
FIG. 5 shows an example of the configuration of the resampling circuit according to the second embodiment.

FIG. 5 shows an example of the configuration of the resampling circuit of the second embodiment. In FIG. 5, components similar to those in FIG. 2 are denoted by the same reference signs. In the description below, the explanation of components similar to those in the first embodiment is omitted or simplified. As shown in FIG. 5, a resampling circuit 1 of the second embodiment includes a low-pass filter 10, a latch 20, a latch 21, a subtractor 22, an accumulator 30, a latch 40, an accumulator 50, a latch 60, a divider 70, and an adder 72.

The configurations and operations of the low-pass filter 10 and the latch 20 are similar to those in the first embodiment and therefore will not be described further.

The latch 21 takes in and holds the AD data outputted from the low-pass filter 10 at every edge of an external trigger. The edge of the external trigger at which the latch 21 takes in the data may be a rising edge or a falling edge according to need. For example, the latch 21 is implemented by a register made up of a predetermined number of D flip-flops. The value held by the latch 21 is equivalent to the reference value described with reference to FIG. 4.

The subtractor 22 subtracts the value of the data held by the latch 20 from the value of the data held by the latch 21.

The accumulator 30 accumulates the value outputted from the subtractor 22 at every edge of a high-frequency clock, when a reset signal from the latch 40 is inactive (for example, low-level). The accumulator 30 initializes the accumulated value to zero when the reset signal from the latch 40 is active (for example, high-level).

The configurations and operations of the latch 40, the accumulator 50, the latch 60, and the divider 70 are similar to those in the first embodiment and therefore will not be described further. The value held by the latch 40 is equivalent to the areas ΔS1, ΔS2, ΔS3, . . . of the difference between the AD data and the reference value for every period of the external trigger, described with reference to FIG. 4. The value held by the latch 60 is equivalent to the time of one period T1 of the external trigger measured with the high-frequency clock, described with reference to FIG. 4. The value outputted from the divider 70 is equivalent to the average value of the difference between the AD data and the reference value for every period T1 of the external trigger, calculated with the resolution of the high-frequency clock.

The adder 72 adds together the value of the data held by the latch 21 and the value outputted from the divider 70. The value outputted from the adder 72 is equivalent to the average value of the AD data for every period T1 of the external trigger, calculated with the resolution of the high-frequency clock. The resampling circuit 1 defines the value outputted from the adder 72 as a resampled value and outputs measurement data having the resampled value.

In the resampling circuit 1 of the second embodiment described above, the low-pass filter 10 filters and outputs AD data. The latch 21 measures the value of the AD data outputted from the low-pass filter 10, in response to an external trigger. The latch 20 and the subtractor 22 define the value of the AD data measured by the latch 21 as a reference value and measure the difference between the reference value and the value of the AD data outputted from the low-pass filter 10 with a high-frequency clock. The accumulator 30 and the latch 40 accumulate the difference measured by the latch 20 and the subtractor 22 in the period of the external trigger. The accumulator 50 and the latch 60 measure the period of the external trigger with the high-frequency clock. The divider 70 divides the difference between the reference value accumulated by the accumulator 30 and the latch 40 and the value of the AD data, by the period of the external trigger measured by the accumulator 50 and the latch 60, and thus calculates the average value of the difference. The adder 72 adds together the reference value and the average value of the difference calculated by the divider 70 and thus calculates the average value as a representative value of the AD data.

The resampling circuit 1 of the second embodiment having such a configuration calculates and outputs measurement data with the time resolution of a high-frequency clock having a higher frequency than the AD clock and the external trigger, based on the AD data outputted from the low-pass filter 10. The measurement data is the average value of the AD data as a representative value calculated based on the AD data in the period of the external trigger. Thus, the resampling circuit 1 of the second embodiment, which asynchronously resamples the AD data in response to the external trigger, can reduce a periodic noise generated in the resampled measurement data.

Also, the resampling circuit 1 of the second embodiment can achieve effects similar to those of the resampling circuit 1 of the first embodiment.

Moreover, in the resampling circuit 1 of the second embodiment, the accumulated value of the difference between the AD data outputted from the low-pass filter 10 and the reference value in the period of the external trigger is smaller than the accumulated value of the AD data. Therefore, the number of bits necessary for averaging is smaller than in the resampling circuit 1 of the first embodiment and this can reduce the circuit area.

Particularly, the narrower the pass range of the low-pass filter 10 is, the higher the correlation is of the AD data outputted from the low-pass filter 10 around when the AD data is updated synchronously with the edge of the AD clock. Thus, for example, making the pass range of the low-pass filter 10 equal to the pass range of the band-limiting filter to be provided on the stage subsequent to the resampling circuit reduces the accumulated value of the difference between the AD data outputted from the low-pass filter 10 and the reference value and also enables omission of the band-limiting filter.

1-3. Third Embodiment

Figure 6:
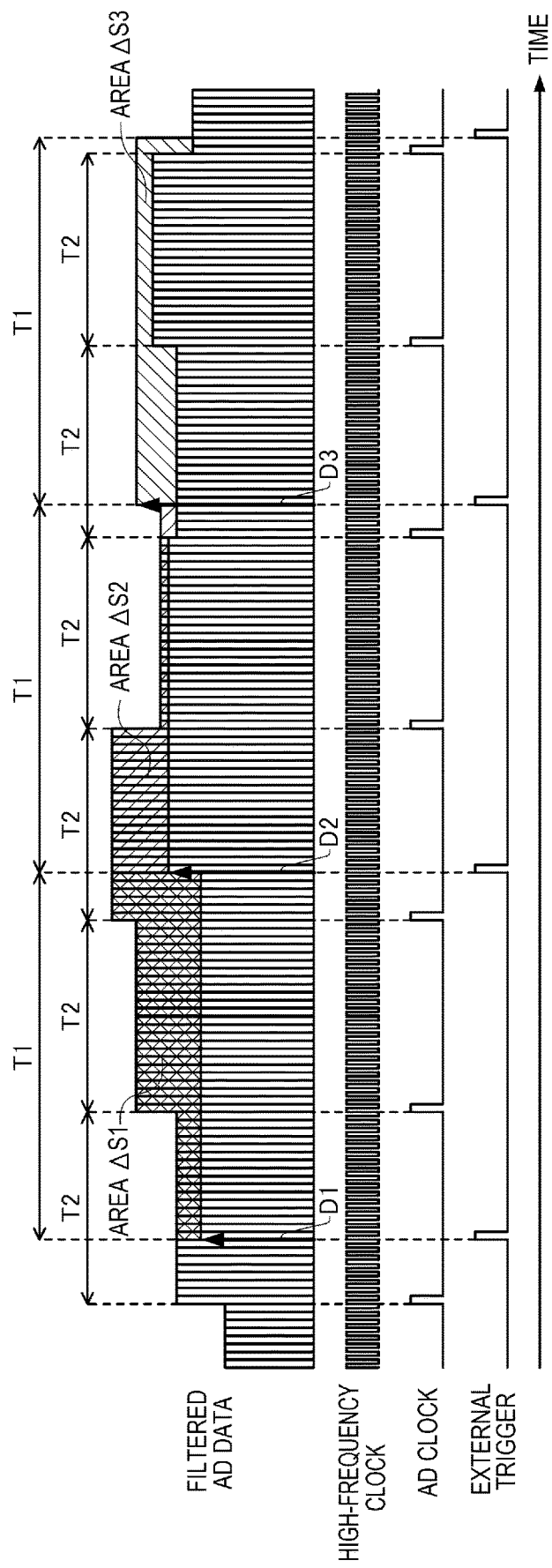
FIG. 6 illustrates an outline of processing in a resampling circuit according to a third embodiment.

FIG. 6 illustrates an outline of processing in a resampling circuit according to a third embodiment. As shown in FIG. 6, the resampling circuit of the third embodiment defines an average value of AD data calculated one period before, as reference values D1, D2, D3, . . . , for every period T1 of an external trigger, accumulates a difference between the AD data resulting from filtering the inputted AD data and the reference value synchronously with a high-frequency clock, and thus calculates areas ΔS1, ΔS2, ΔS3, . . . of the difference for every period of the external trigger with the resolution of the high-frequency clock. The resampling circuit of the third embodiment then measures the time of one period T1 of the external trigger with the high-frequency clock, defines an average value of the AD data obtained by adding together the areas ΔS1, 4S2, 4S3, . . . of the difference divided by the measured time for every period T1 of the external trigger and the reference values D1, D2, D3, . . . , as a resampled value, and outputs measurement data having the resampled value.

Figure 7:
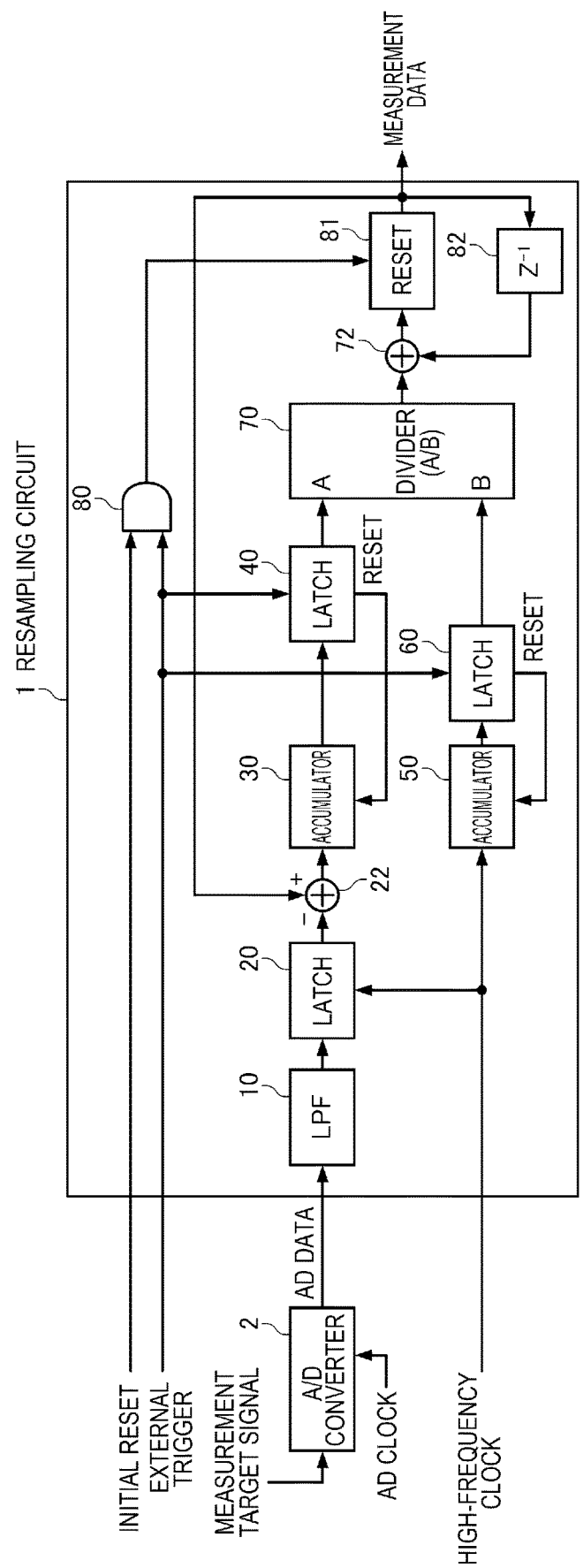
FIG. 7 shows an example of the configuration of the resampling circuit according to the third embodiment.

FIG. 7 shows an example of the configuration of the resampling circuit of the third embodiment. In FIG. 7, components similar to those in FIG. 2 or FIG. 5 are denoted by the same reference signs. In the description below, the explanation of components similar to those in the first embodiment or the second embodiment is omitted or simplified. As shown in FIG. 7, a resampling circuit 1 of the third embodiment includes a low-pass filter 10, a latch 20, a subtractor 22, an accumulator 30, a latch 40, an accumulator 50, a latch 60, a divider 70, an adder 72, an AND circuit 80, a resetter 81, and a delay ($Z^{-1}$) 82.

The configurations and operations of the low-pass filter 10 and the latch 20 are similar to those in the first embodiment and therefore will not be described further.

The subtractor 22 subtracts the value of the data held by the latch 20 from the measurement data outputted from the resampling circuit 1, that is, the average value of the AD data outputted from the low-pass filter 10 calculated in the immediately preceding period of the external trigger.

The configurations and operations of the accumulator 30, the latch 40, the accumulator 50, the latch 60, and the divider 70 are similar to those in the first embodiment and therefore will not be described further. The value held by the latch 40 is equivalent to the areas ΔS1, ΔS2, ΔS3, . . . of the difference between the AD data and the reference value for every period of the external trigger, described with reference to FIG. 6. The value held by the latch 60 is equivalent to the time of one period T1 of the external trigger measured with the high-frequency clock, described with reference to FIG. 6. The value outputted from the divider 70 is equivalent to the average value of the difference between the AD data and the reference value for every period T1 of the external trigger, calculated with the resolution of the high-frequency clock.

The delay 82 delays the measurement data outputted from the resampling circuit 1 by one period of the external trigger and outputs the delayed measurement data. For example, the delay 82 is implemented by a register made up of a predetermined number of D flip-flops taking in and holding the measurement data at every edge of the external trigger. The edge of the external trigger may be the same as the edge of the external trigger at which the latch 40 and the latch 60 respectively take in the accumulated value.

The adder 72 adds together the data outputted from the delay 82 and the value outputted from the divider 70.

The AND circuit 80 has an initial reset signal and an external trigger inputted thereto and outputs an AND signal of these. Specifically, the AND circuit 80 outputs a high-level AND signal at the timing of the next external trigger being high-level, when the initial reset signal is high-level.

The resetter 81 outputs zero in place of the value outputted from the adder 72 when the AND signal outputted from the AND circuit 80 is high-level. This causes the delay 82 to output zero. The value outputted from the resetter 81 is equivalent to the average value of the AD data for every period T1 of the external trigger, calculated with the resolution of the high-frequency clock. Thus, the resampling circuit 1 has the function of initializing the average value of AD. The resampling circuit 1 defines the value outputted from the resetter 81 as a resampled value and outputs measurement data having the resampled value.

In the resampling circuit 1 of the third embodiment described above, the low-pass filter 10 filters and outputs AD data. The latch 20 measures the value of the AD data outputted from the low-pass filter 10 with a high-frequency clock. The subtractor 22 defines the value of the measurement data outputted from the resampling circuit 1 as a reference value and measures the difference between the reference value and the value of the AD data measured by the latch 20, with the high-frequency clock. The accumulator 30 and the latch 40 accumulate the difference measured by the subtractor 22 in the period of the external trigger. The accumulator 50 and the latch 60 measure the period of the external trigger with the high-frequency clock. The divider 70 divides the difference between the reference value and the value of the AD data accumulated by the accumulator 30 and the latch 40, by the period of the external trigger measured by the accumulator 50 and the latch 60, and thus calculates the average value of the difference. The adder 72, the resetter 81, and the delay 82 add together the reference value and the average value of the difference calculated by the divider 70, and thus calculate the average value as a representative value of the AD data.

The resampling circuit 1 of the third embodiment having such a configuration calculates and outputs measurement data with the time resolution of a high-frequency clock having a higher frequency than the AD clock and the external trigger, based on the AD data outputted from the low-pass filter 10. The measurement data is the average value of the AD data as a representative value calculated based on the AD data in the period of the external trigger. Thus, the resampling circuit 1 of the third embodiment, which asynchronously resamples the AD data in response to the external trigger, can reduce a periodic noise generated in the resampled measurement data.

Also, the resampling circuit 1 of the third embodiment can achieve effects similar to those of the resampling circuit 1 of the second embodiment.

Moreover, the resampling circuit 1 of the third embodiment calculates the average value of the AD data, based on the average value of the AD data one period before as a reference value for every period of the external trigger. Therefore, when the time difference between the edge of the high-frequency clock and the edge of the external trigger is small, a random sampling error generated due to the jitter of the high-frequency clock is incorporated into and smoothed by the average value of the AD data calculated in the next period. This can make the accuracy of the measurement data higher than in the resampling circuit 1 of the second embodiment.

1-4. Fourth Embodiment

Figure 8:
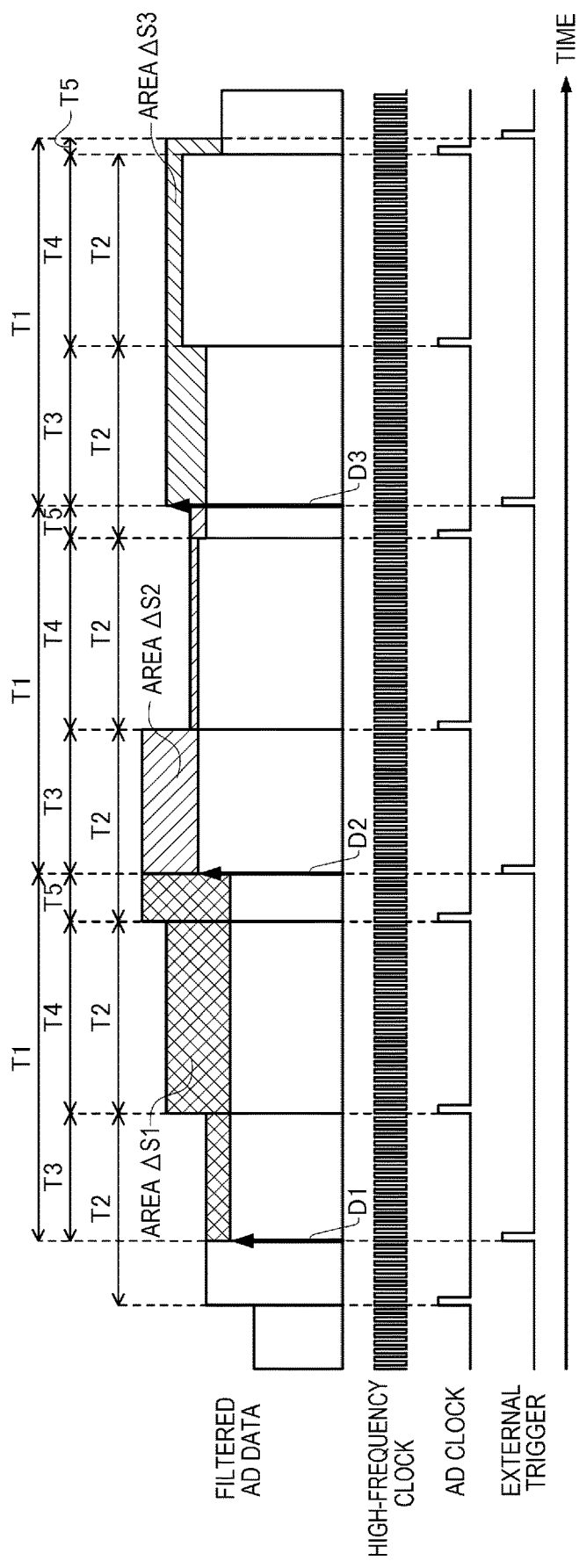
FIG. 8 illustrates an outline of processing in a resampling circuit according to a fourth embodiment.

FIG. 8 illustrates an outline of processing in a resampling circuit according to a fourth embodiment. As shown in FIG. 8, the resampling circuit of the fourth embodiment defines an average value of AD data calculated one period before, as reference values D1, D2, D3, . . . , for every period T1 of an external trigger, accumulates the product of the difference between the inputted and filtered AD data and the reference value, and the number of edges of a high-frequency clock, in respective spans T3, T4, T5, . . . split by edges of the external trigger and edges of an AD clock, and thus calculates areas ΔS1, ΔS2, ΔS3, . . . of the difference for every period of the external trigger with the resolution of the high-frequency clock. The resampling circuit of the fourth embodiment then measures the time of one period T1 of the external trigger with the high-frequency clock, defines an average value of the AD data obtained by adding together the areas ΔS1, 4S2, 4S3, . . . of the difference divided by the measured time for every period T1 of the external trigger and the reference values D1, D2, D3, . . . , as a resampled value, and outputs measurement data having the resampled value.

Figure 9:
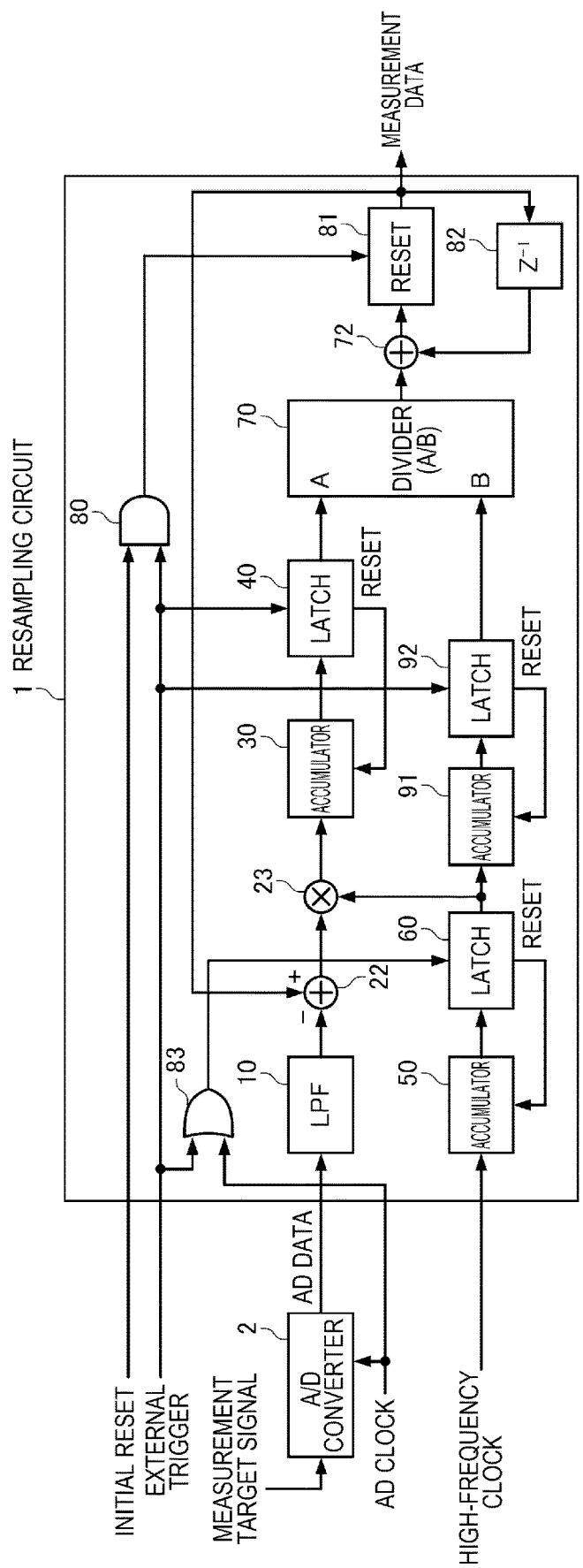
FIG. 9 shows an example of the configuration of the resampling circuit according to the fourth embodiment.

FIG. 9 shows an example of the configuration of the resampling circuit of the fourth embodiment. In FIG. 9, components similar to those in FIG. 2, FIG. 5 or FIG. 7 are denoted by the same reference signs. In the description below, the explanation of components similar to those in the first embodiment, the second embodiment or the third embodiment is omitted or simplified. As shown in FIG. 9, a resampling circuit 1 of the fourth embodiment includes a low-pass filter 10, a subtractor 22, a multiplier 23, an accumulator 30, a latch 40, an accumulator 50, a latch 60, a divider 70, an adder 72, an AND circuit 80, a resetter 81, a delay ($Z^{-1}$) 82, an OR circuit 83, an accumulator 91, and a latch 92.

The OR circuit 83 has the external trigger and the AD clock inputted thereto and outputs an OR signal of these.

The accumulator 50 accumulates the number of edges of the high-frequency clock when a reset signal from the latch 60 is inactive (for example, low-level). The accumulator 50 initializes the accumulated value to zero when the reset signal from the latch 60 is active (for example, high-level).

The latch 60 takes in and holds the value accumulated by the accumulator 50 at every edge of the OR signal outputted from the OR circuit 83, that is, every time an edge of the external trigger or an edge of the AD clock comes. The latch 60 also turns the reset signal active for a predetermined time and supplies the reset signal to the accumulator 50. The value held by the latch 60 is equivalent to the respective spans T3, T4, T5, . . . split by edges of the external trigger and edges of the AD clock, described with reference to FIG. 8.

The accumulator 91 accumulates the value held by the latch 60 at every edge of the OR signal, that is, every time an edge of the external trigger or an edge of the AD clock comes, when a reset signal from the latch 92 is inactive (for example, low-level). The accumulator 91 initializes the accumulated value to zero when the reset signal from the latch 92 is active (for example, high-level).

The latch 92 takes in and holds the value accumulated by the accumulator 91 at every edge of the external trigger and also turns the reset signal active for a predetermined time and supplies the reset signal to the accumulator 91. The value held by the latch 92 is equivalent to the time of one period T1 of the external trigger measured with the high-frequency clock, described with reference to FIG. 8.

The configuration and operation of the low-pass filter 10 are similar to those in the first embodiment and therefore will not be described further.

The subtractor 22 subtracts the value of the AD data outputted from the low-pass filter 10 from the measurement data outputted from the resampling circuit 1, that is, the average value of the AD data outputted from the low-pass filter 10 calculated in the immediately preceding period of the external trigger.

The multiplier 23 multiplies together the value outputted from the subtractor 22 and the value held by the latch 60.

The accumulator 30 accumulates the value outputted from the multiplier 23 at every edge of the OR signal, that is, every time an edge of the external trigger or an edge of the AD clock comes, when a reset signal from the latch 40 is inactive (for example, low-level). The accumulator 30 initializes the accumulated value to zero when the reset signal from the latch 40 is active (for example, high-level).

The configuration and operation of the latch 40 are similar to those in the first embodiment and therefore will not be described further. The value held by the latch is equivalent to the areas ΔS1, ΔS2, ΔS3, . . . of the difference between the AD data and the reference value for every period of the external trigger, described with reference to FIG. 8.

The divider 70 divides the value held by the latch 40 by the value held by the latch 92. The value outputted from the divider 70 is equivalent to the average value of the difference between the AD data and the reference value for every period T1 of the external trigger, calculated with the resolution of the high-frequency clock.

The configurations and operations of the adder 72, the AND circuit 80, the resetter 81, and the delay 82 are similar to those in the third embodiment and therefore will not be described further. The value outputted from the resetter 81 is equivalent to the average value of the AD data for every period T1 of the external trigger, calculated with the resolution of the high-frequency clock. The resampling circuit 1 defines the value outputted from the resetter 81 as a resampled value and outputs measurement data having the resampled value.

In the resampling circuit 1 of the fourth embodiment described above, the low-pass filter 10 filters and outputs AD data. The subtractor 22 defines the value of the measurement data outputted from the resampling circuit 1 as a reference value and calculates the difference between the reference value and the value of the AD data outputted from the low-pass filter 10. The accumulator 50 and the latch 60 measure a span from an edge of the external trigger to an edge of the AD clock, a span from an edge of the AD clock to the next edge, and a span from an edge of the AD clock to an edge of the external trigger, with the high-frequency clock. The accumulator 91 and the latch 92 accumulate the span measured by the accumulator 50 and the latch 60 in the period of the external trigger. The multiplier 23 multiplies together the span measured by the accumulator 50 and the latch 60 and the difference between the reference value and the value of the AD data calculated by the subtractor 22 and thus calculates an accumulated value of the difference. The accumulator 30 and the latch accumulate the accumulated value of the difference calculated by the multiplier 23, in the period of the external trigger. The divider 70 divides the accumulated value of the difference accumulated by the accumulator 30 and the latch 40 by the span accumulated by the accumulator 91 and the latch 92 and thus calculates the average value of the difference. The adder 72, the resetter 81, and the delay 82 add together the reference value and the average value of the difference calculated by the divider 70, and thus calculate the average value as a representative value of the AD data.

The resampling circuit 1 of the fourth embodiment having such a configuration calculates and outputs measurement data with the time resolution of a high-frequency clock having a higher frequency than the AD clock and the external trigger, based on the AD data outputted from the low-pass filter 10. The measurement data is the average value of the AD data as a representative value calculated based on the AD data in the period of the external trigger. Thus, the resampling circuit 1 of the fourth embodiment, which asynchronously resamples the AD data in response to the external trigger, can reduce a periodic noise generated in the resampled measurement data.

Also, the resampling circuit 1 of the fourth embodiment can achieve effects similar to those of the resampling circuit 1 of the third embodiment.

Moreover, in the resampling circuit 1 of the fourth embodiment, the multiplication of the difference between the reference value and the value of the AD data may have to be carried out only once in the respective spans resulting from splitting the period of the external trigger at edges of the external trigger and edges of the AD clock. This requires a smaller amount of calculation than in the resampling circuit 1 of the third embodiment and therefore eliminates the need for multiplication at every edge of the high-speed high-frequency clock.

1-5. Fifth Embodiment

A resampling circuit according to a fifth embodiment accumulates the product of the difference between the AD data in the respective spans T3, T4, T5, . . . described with reference to FIG. 8 and the reference values D1, D2, D3, . . . described with reference to FIG. 8, and the value of the number of edges of the high-frequency clock in the respective spans T3, T4, T5, . . . divided by the number of edges N of the high-frequency clock in one period T2 of the AD clock, for every period T1 of an external trigger, and thus calculates 1/N of the areas ΔS1, ΔS2, ΔS3, . . . of the difference described with reference to FIG. 8. The resampling circuit of the fifth embodiment then measures the time of one period T1 of the external trigger with the high-frequency clock, defines an average value of the AD data resulting from adding together 1/N of the areas ΔS1, 4S2, 4S3, . . . of the difference divided by 1/N of the measured time, and the reference values D1, D2, D3, . . . , for every period T1 of the external trigger, as a resampled value, and outputs measurement data having the resampled value.

Figure 10:
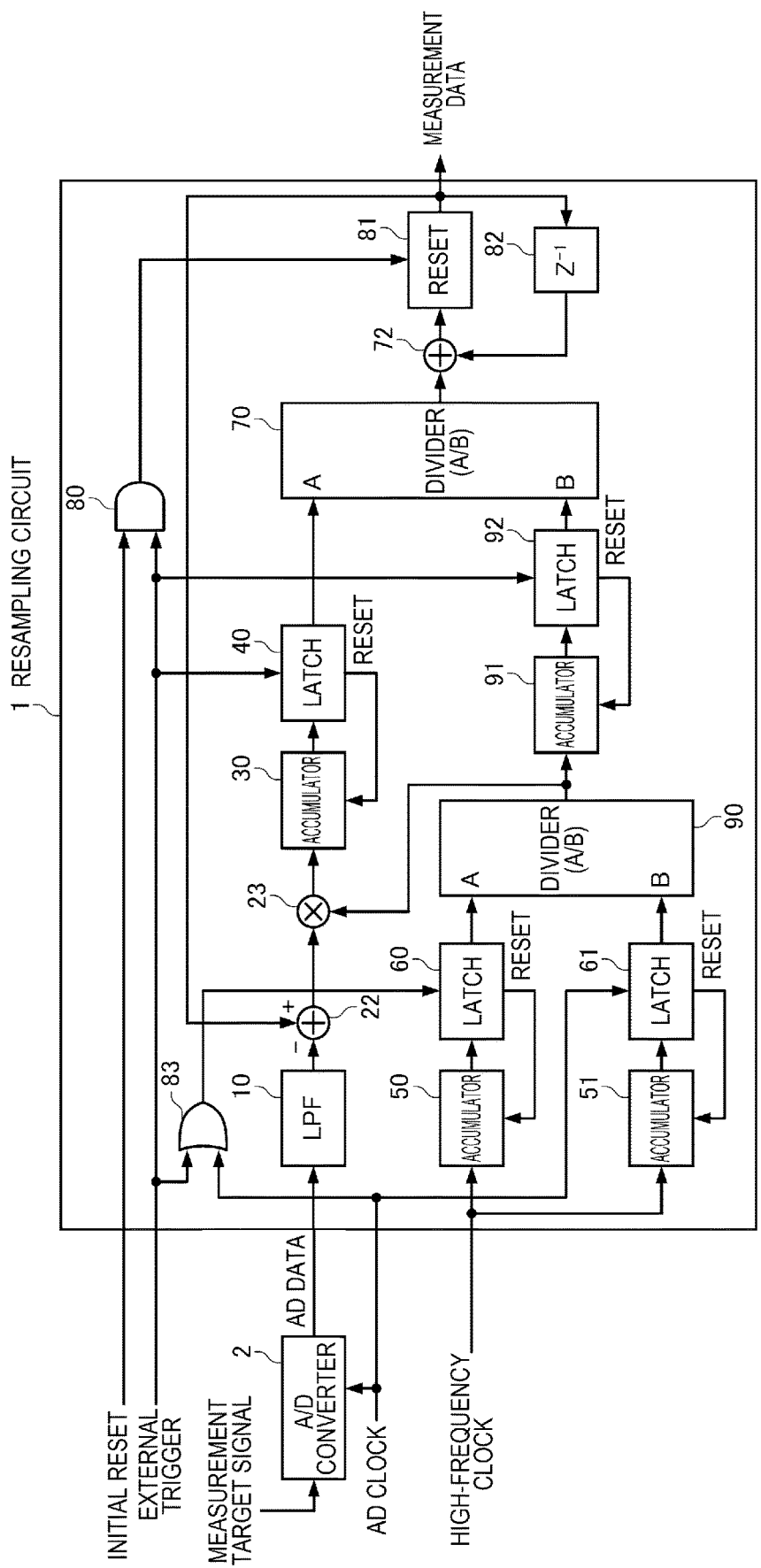
FIG. 10 shows an example of the configuration of a resampling circuit according to a fifth embodiment.

FIG. 10 shows an example of the configuration of the resampling circuit of the fifth embodiment. In FIG. 10, components similar to those in FIG. 2, FIG. 5, FIG. 7 or FIG. 9 are denoted by the same reference signs. In the description below, the explanation of components similar to those in the first embodiment, the second embodiment, the third embodiment or the fourth embodiment is omitted or simplified. As shown in FIG. 10, a resampling circuit 1 of the fifth embodiment includes a low-pass filter 10, a subtractor 22, a multiplier 23, an accumulator 30, a latch 40, an accumulator 50, a latch 60, an accumulator 51, a latch 61, a divider 70, an adder 72, an AND circuit 80, a resetter 81, a delay ($Z^{-1}$) 82, an OR circuit 83, a divider 90, an accumulator 91, and a latch 92.

The configurations and operations of the accumulator 50, the latch 60, and the OR circuit 83 are similar to those in the fourth embodiment and therefore will not be described further. The value held by the latch 60 is equivalent to the respective spans T3, T4, T5, . . . split by edges of the external trigger and edges of the AD clock, described with reference to FIG. 8.

The accumulator 51 accumulates the number of edges of the high-frequency clock when a reset signal from the latch 61 is inactive (for example, low-level). The accumulator 51 initializes the accumulated value to zero when the reset signal from the latch 61 is active (for example, high-level).

The latch 61 takes in and holds the value accumulated by the accumulator 51 at every edge of the AD clock and also turns the reset signal active for a predetermined time and supplies the reset signal to the accumulator 51. The value held by the latch 61 is equivalent to the number of edges N of the high-frequency clock in one period T2 of the AD clock.

The divider 90 divides the value held by the latch 60 by the value held by the latch 61. The value outputted from the divider 90 is equivalent to the number of edges of the high-frequency clock in the respective spans T3, T4, T5, . . . described with reference to FIG. 8 divided by the number of edges N of the high-frequency clock in one period T2 of the AD clock.

The accumulator 91 accumulates the value outputted from the divider 90 at every edge of the OR signal, that is, every time an edge of the external trigger or an edge of the AD clock comes, when a reset signal from the latch 92 is inactive (for example, low-level). The accumulator 91 initializes the accumulated value to zero when the reset signal from the latch 92 is active (for example, high-level).

The configuration and operation of the latch 92 are similar to those in the fourth embodiment and therefore will not be described further. The value held by the latch 92 is equivalent to 1/N of the time of one period T1 of the external trigger measured with the high-frequency clock, described with reference to FIG. 8.

The configuration and operation of the low-pass filter 10 are similar to those in the first embodiment and therefore will not be described further. The configuration and operation of the subtractor 22 are similar to those in the fourth embodiment and therefore will not be described further.

The multiplier 23 multiplies together the value outputted from the subtractor 22 and the value outputted from the divider 90.

The configuration and operation of the accumulator are similar to those in the fourth embodiment and therefore will not be described further. The configuration and operation of the latch 40 are similar to those in the first embodiment and therefore will not be described further. The value held by the latch 40 is equivalent to 1/N of the areas ΔS1, ΔS2, ΔS3, . . . of the difference between the AD data and the reference value for every period of the external trigger, described with reference to FIG. 8.

The configuration and operation of the divider 70 are similar to those in the fourth embodiment and therefore will not be described further. The value outputted from the divider 70 is equivalent to the average value of the difference between the AD data and the reference value for every period T1 of the external trigger, calculated with the resolution of the high-frequency clock.

The configurations and operations of the adder 72, the AND circuit 80, the resetter 81, and the delay 82 are similar to those in the third embodiment and therefore will not be described further. The value outputted from the resetter 81 is equivalent to the average value of the AD data for every period T1 of the external trigger, calculated with the resolution of the high-frequency clock. The resampling circuit 1 defines the value outputted from the resetter 81 as a resampled value and outputs measurement data having the resampled value.

In the resampling circuit 1 of the fifth embodiment described above, the low-pass filter 10 filters and outputs AD data. The subtractor 22 defines the value of the measurement data outputted from the resampling circuit 1 as a reference value and calculates the difference between the reference value and the value of the AD data outputted from the low-pass filter 10. The accumulator 50 and the latch 60 measure a span from an edge of the external trigger to an edge of the AD clock, a span from an edge of the AD clock to the next edge, and a span from an edge of the AD clock to an edge of the external trigger, with the high-frequency clock. The accumulator 51 and the latch 61 measure the period of the AD clock with the high-frequency clock. The divider 90 calculates the ratio between the span measured by the accumulator 50 and the latch 60 and the period of the AD clock measured by the accumulator 51 and the latch 61. The accumulator 91 and the latch 92 accumulate the ratio calculated by the divider 90, in the period of the external trigger. The multiplier 23 multiplies together the ratio calculated by the divider 90 and the difference between the reference value and the value of the AD data calculated by the subtractor 22. The accumulator 30 and the latch 40 accumulate the multiplied value of the ratio and the difference calculated by the multiplier 23, in the period of the external trigger. The divider 70 divides the multiplied value accumulated by the accumulator 30 and the latch 40 by the ratio accumulated by the accumulator 91 and the latch 92 and thus calculates the average value of the difference. The adder 72, the resetter 81, and the delay 82 add together the reference value and the average value of the difference calculated by the divider 70, and thus calculate the average value as a representative value of the AD data.

The resampling circuit 1 of the fifth embodiment having such a configuration calculates and outputs measurement data with the time resolution of a high-frequency clock having a higher frequency than the AD clock and the external trigger, based on the AD data outputted from the low-pass filter 10. The measurement data is the average value of the AD data as a representative value calculated based on the AD data in the period of the external trigger. Thus, the resampling circuit 1 of the fifth embodiment, which asynchronously resamples the AD data in response to the external trigger, can reduce a periodic noise generated in the resampled measurement data.

Also, the resampling circuit 1 of the fifth embodiment can achieve effects similar to those of the resampling circuit 1 of the fourth embodiment.

Moreover, in the resampling circuit 1 of the fifth embodiment, the accumulated value by the accumulator 30 and the accumulated value by the accumulator 91 are 1/N, compared with the resampling circuit 1 of the fourth embodiment. Thus, the circuit area can be made smaller than in the resampling circuit 1 of the fourth embodiment.

2. Physical Quantity Sensor Unit

A physical quantity sensor unit according to this embodiment includes the resampling circuit 1 of the foregoing embodiments and a physical quantity sensor which outputs a measurement target signal. The physical quantity sensor unit outputs packet data including detection data of a physical quantity, synchronously with an external trigger supplied from an arithmetic processing device (host). The physical quantity sensor detects at least one of acceleration and angular velocity as a physical quantity. In the description below, a physical quantity sensor unit 100 having a physical quantity sensor which is an acceleration sensor for detecting acceleration as a physical quantity is described as an example.

Figure 11:
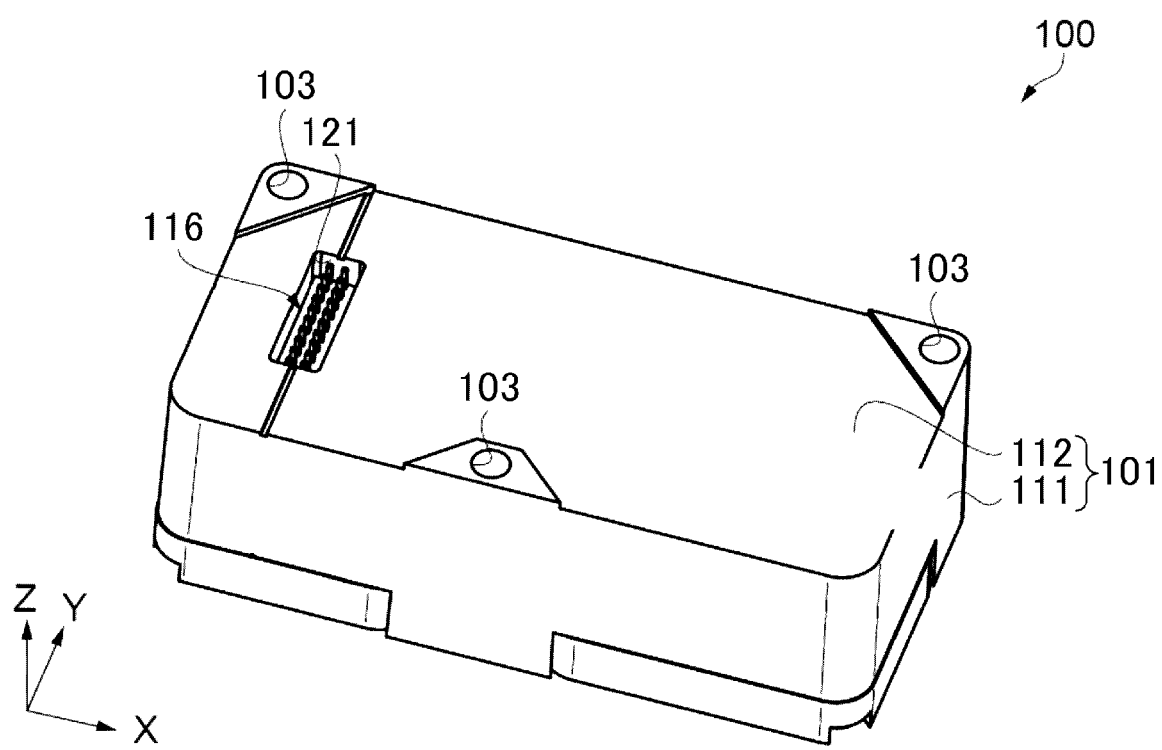
FIG. 11 is a perspective view showing an outline of a physical quantity sensor unit.

FIG. 11 is a perspective view showing the configuration of the physical quantity sensor unit 100 as viewed from an installation target surface where the physical quantity sensor unit 100 is fixed. In the description below, an axis along the long sides of the physical quantity sensor unit 100, which is rectangular as viewed in a plan view, is defined as an X-axis. An axis orthogonal to the X-axis as viewed in a plan view is defined as a Y-axis. An axis along the thickness of the physical quantity sensor unit 100 is defined as a Z-axis.

The physical quantity sensor unit 100 is a rectangular parallelepiped having a rectangular planar shape. The physical quantity sensor unit 100 is, for example, approximately 50 mm long on the long sides along the X-axis, approximately 24 mm long on the short sides along the Y-axis orthogonal to the X-axis, and approximately 16 mm thick. The physical quantity sensor unit 100 has a screw hole 103 formed at two positions near both ends of one long side and at one position in a center part of the other long side. The physical quantity sensor unit 100 is used in the state of being fixed to an installation target surface of an installation target object (device) of a structure such as a bridge or bulletin board, with a fixing screw inserted in each of the three screw holes 103.

As shown in FIG. 11, an opening 121 is provided on a surface of the physical quantity sensor unit 100 as viewed from the installation target surface. A plug-type connector 116 is arranged inside the opening 121. The connector 116 has a plurality of pins arranged in two lines. In each line, a plurality of pins is arrayed along the Y-axis. A socket-type connector, not illustrated, is coupled to the connector 116 from the installation target object. This allows transmission and reception of a drive voltage of the physical quantity sensor unit 100 and an electrical signal such as detection data.

Figure 12:
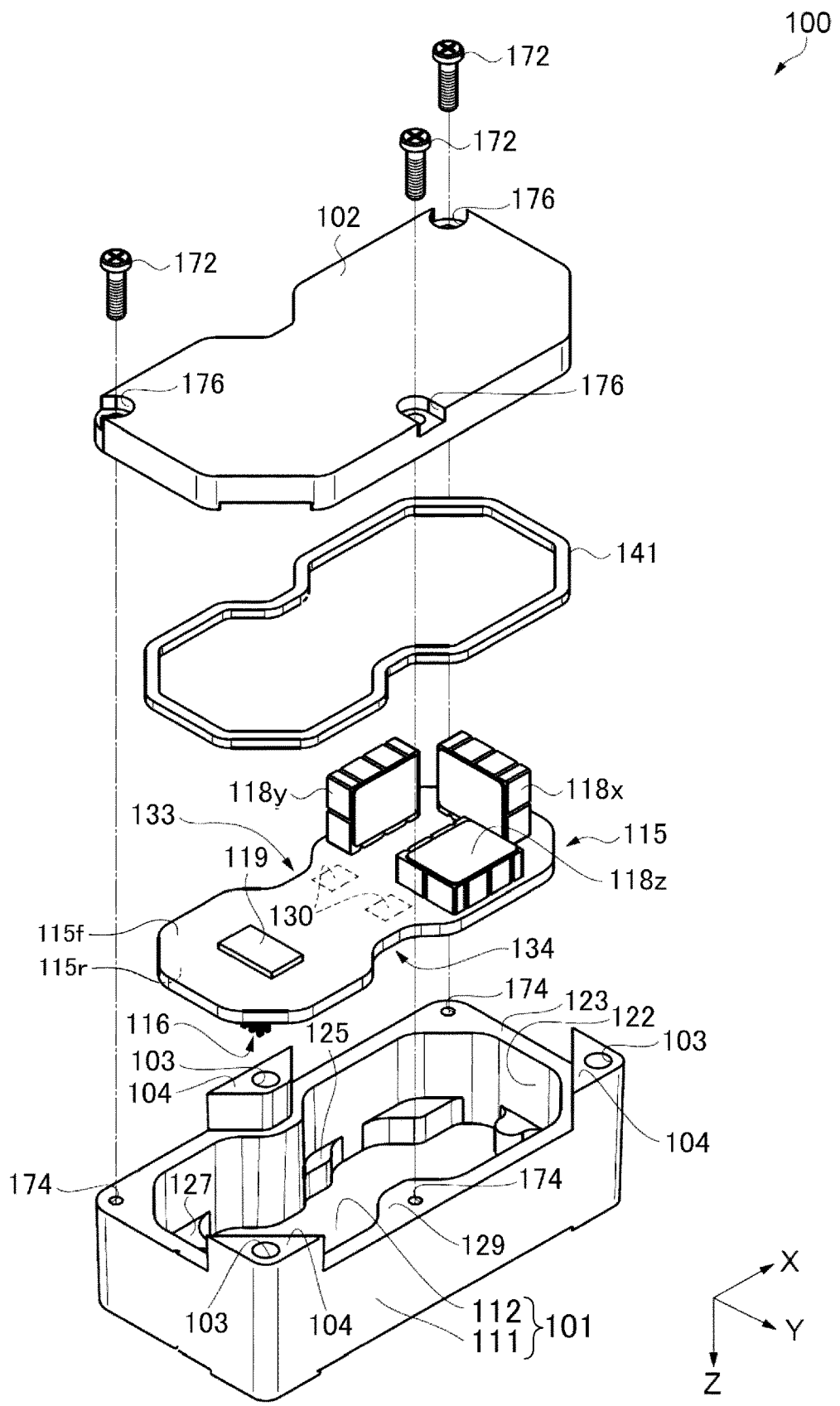
FIG. 12 is an exploded perspective view of the physical quantity sensor unit.

FIG. 12 is an exploded perspective view of the physical quantity sensor unit 100. As shown in FIG. 12, the physical quantity sensor unit 100 is made up of a container 101, a lid 102, a seal member 141, and a circuit board 115 or the like. More specifically, in the physical quantity sensor unit 100, the circuit board 115 is installed inside the container 101 via a fixing member 130, and the opening of the container 101 is covered with the lid 102 via the seal member 141 having a shock absorbing property.

The container 101 is, for example, an accommodation container for the circuit board 115, made of aluminum and molded into the shape of a box having an internal space. The container 101 can be formed by slicing or die-casting (metal mold casting) aluminum. The material of the container 101 is not limited to aluminum and may be other metals such as zinc or stainless steel or may be a resin or a composite material of a metal and a resin. The outer shape of the container 101 is a rectangular parallelepiped having a substantially rectangular planar shape, similarly to the overall shape of the physical quantity sensor unit 100. The container 101 has a fixing protrusion 104 provided at two positions near both ends of one long side and at one position in a center part of the other long side. The screw hole 103 is formed in each of the fixing protrusions 104. The fixing protrusion 104 provided at the two positions near both ends of the one long side is substantially triangular as viewed in a plan view, including an intersection part between the short side and the long side. The fixing protrusion 104 provided at the one position in the center part of the other long side is substantially trapezoidal, facing the internal space of the container 101 as viewed in a plan view.

The container 101 is in the shape of a box having a rectangular-parallelepiped outer shape and opening to one side. The inside of the container 101 is an internal space (accommodation space) surrounded by a bottom wall 112 and a sidewall 111. In other words, the container 101 is in the shape of a box where one face opposite the bottom wall 112 is an opening face 123. The outer edge of the circuit board 115 is arranged (accommodated) along an inner surface 122 of the sidewall 111. The lid 102 is fixed to cover the opening. The opening face 123 opposite the bottom wall 112 is the face where the lid 102 is placed. On the opening face 123, the fixing protrusion 104 is provided upright at the two positions near both ends of the one long side of the container 101 and at the one position in the center part of the other long side. The top surface (surface exposed in the –Z direction) of the fixing protrusion 104 is flush with the top surface of the container 101.

In the internal space of the container 101, a protrusion 129 protruding into the internal space from the sidewall 111 over a range from the bottom wall 112 to the opening face 123 is provided in a center part of the one long side opposite the fixing protrusion 104 provided in the center part of the other long side. A female screw 174 is provided on the top surface (flush with the opening face 123) of the protrusion 129. The lid 102 is fixed to the container 101 via the seal member 141, with a screw 172 inserted in a penetration hole 176 and the female screw 174. The fixing protrusion 104 provided in the center part of the other long side may protrude into the internal space from the sidewall 111 over a range from the bottom wall 112 to the opening face 123, similarly to the protrusion 129. The protrusion 129 and the fixing protrusion 104 are provided at positions facing constricted parts 133, 134 of the circuit board 115, described later.

In the internal space of the container 101, a first pedestal 127 and a second pedestal 125 protruding in the form of a step rising from the bottom wall 112 toward the opening face 123 are provided. The first pedestal 127 is provided at a position facing the arrangement area of the plug-type (male) connector 116 installed on the circuit board 115 and is provided with the opening 121 (see FIG. 11) where the plug-type (male) connector 116 is inserted. The first pedestal 127 functions as a pedestal for fixing the circuit board 115 to the container 101. The opening 121 penetrates the container 101 from the inside (inner side) to the outside.

The second pedestal 125 is located on the other side of the fixing protrusion 104 and the protrusion 129 located in the center parts of the long sides, from the first pedestal 127, and is provided near the fixing protrusion 104 and the protrusion 129. The second pedestal 125 may be coupled to one of the fixing protrusion 104 and the protrusion 129. The second pedestal 125 functions as a pedestal for fixing the circuit board 115 to the container 101, on the other side of the fixing protrusion 104 and the protrusion 129 from the first pedestal 127.

The outer shape of the container 101 is described as the shape of a rectangular-parallelepiped box having a substantially rectangular planar shape and no lid. However, the outer shape of the container 101 is not limited to this. The planar shape of the outer shape of the container 101 may be square, hexagonal, octagonal or the like. In the planar shape of the outer shape of the container 101, the vertices of the polygon may be chamfered and one of the sides may be curved. The planar shape inside the container 101 is not limited to the foregoing shape, either, and may be another shape. The planar shapes of the outer shape and inside of the container 101 may be similar or not similar to each other.

The circuit board 115 is a multilayer board having a plurality of through-holes or the like formed therein and uses a glass epoxy board. However, the circuit board 115 is not limited to a glass epoxy board and may be a rigid board on which a plurality of physical quantity sensors, electronic components, connectors and the like can be installed. For example, a composite board or a ceramic board may be used.

The circuit board 115 has a second surface 115r on the side of the bottom wall 112 and a first surface 115f having a front-back relation with the second surface 115r. On the first surface 115f of the circuit board 115, a control IC 119 as a processor and acceleration sensors 118x, 118y, 118z as physical quantity sensors are installed. On the second surface 115r of the circuit board 115, the connector 116 is installed. Although not illustrated or described, other wirings and terminal electrodes or the like may be provided on the circuit board 115.

The circuit board 115 has the constricted parts 133, 134, which are formed by constricting the outer edge of the circuit board 115, in a center part along the X-axis on the long sides of the container 101, as viewed in a plan view. The constricted parts 133, 134 are provided on both sides along the Y-axis of the circuit board 115, as viewed in a plan view, and are constricted toward the center from the outer edge of the circuit board 115. The constricted parts 133, 134 are provided facing the protrusion 129 and the fixing protrusion 104 of the container 101.

The circuit board 115 is inserted in the internal space of the container 101, with the second surface 115r facing the first pedestal 127 and the second pedestal 125. The circuit board 115 is supported in the container 101 by the first pedestal 127 and the second pedestal 125.

The acceleration sensors 118x, 118y, 118z detecting acceleration as a physical quantity respectively detect acceleration along one axis. Specifically, the acceleration sensor 118x is provided upright in such a way that the front and back surfaces of its package are placed on the X-axis and that a lateral surface faces the first surface 115f of the circuit board 115. The acceleration sensor 118x detects acceleration applied on the X-axis and outputs a measurement target signal corresponding to the detected acceleration. The acceleration sensor 118y is provided upright in such a way that the front and back surfaces of its package are placed on the Y-axis and that a lateral surface faces the first surface 115f of the circuit board 115. The acceleration sensor 118y detects acceleration applied on the Y-axis and outputs a measurement target signal corresponding to the detected acceleration. The acceleration sensor 118z is provided in such a way that the front and back surfaces of its package are placed on the Z-axis and that the front and back surfaces of the package directly face the first surface 115f of the circuit board 115. The acceleration sensor 118z detects acceleration applied on the Z-axis and outputs a measurement target signal corresponding to the detected acceleration.

The control IC 119 as a processor is electrically coupled to the acceleration sensors 118x, 118y, 118z via a wiring, not illustrated. The control IC 119 is a MCU (micro controller unit) and includes an A/D converter (equivalent to the A/D converter 2 described in the above embodiments) to which the measurement target signals outputted respectively from the acceleration sensors 118x, 118y, 118z are inputted, the resampling circuit 1 of one of the above embodiments, a digital processing circuit which performs various kinds of conversion and correction on the measurement data outputted from the resampling circuit 1 and generates detection data, and a storage unit including a non-volatile memory, or the like. The control IC 119 controls each part of the physical quantity sensor unit 100. The control IC 119 also generates detection data synchronized with an external trigger, based on the measurement target signals outputted respectively from the acceleration sensors 118x, 118y, 118z, and generates packet data including the detection data. In the storage unit, a program prescribing the order and content of detecting acceleration, a program for including the detection data into the packet data, and accompanying data or the like are stored. Although not illustrated, a plurality of other electronic components or the like may be installed on the circuit board 115.

An example of the configuration of the acceleration sensors 118x, 118y, 118z will now be described with reference to FIGS. 13 and 14.

Figure 13:
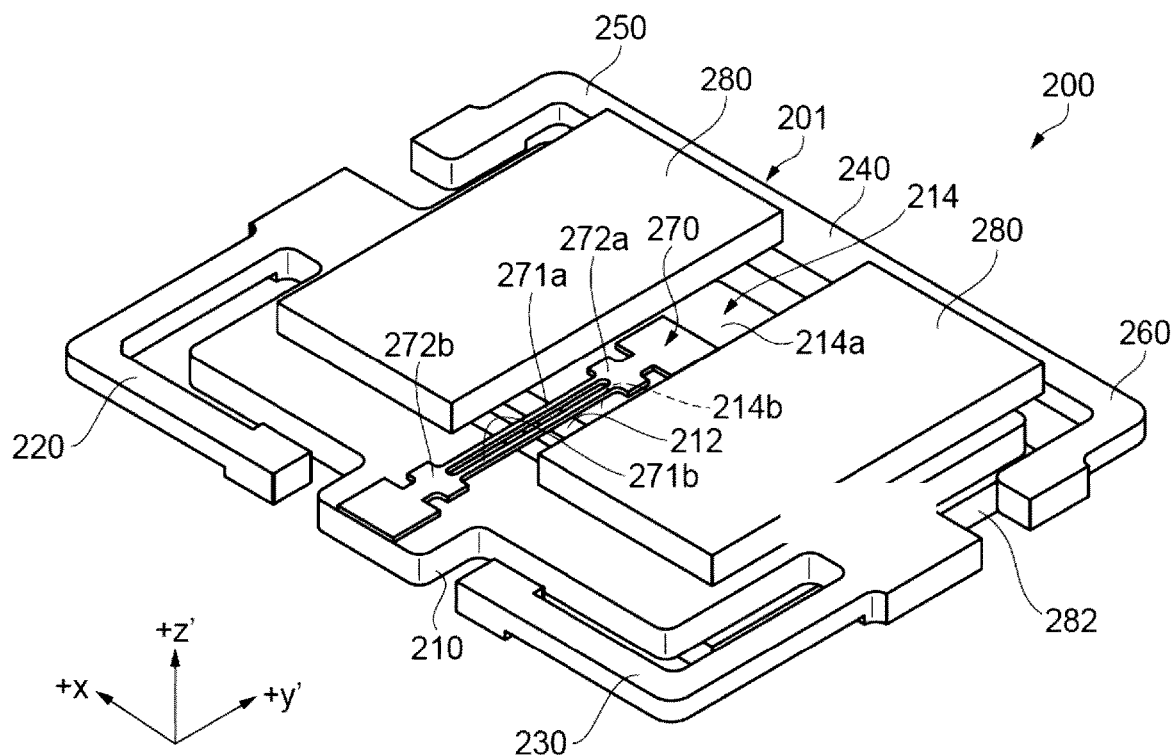
FIG. 13 is a perspective view illustrating a schematic configuration of an acceleration sensor element.

FIG. 13 is a perspective view for explaining a schematic configuration of a sensor element for detecting acceleration. FIG. 14 is a cross-sectional view for explaining an acceleration detector using a sensor element for detecting acceleration.

In FIG. 13, an x-axis, a y'-axis, and a z'-axis are shown as three axes orthogonal to each other. An example of using a so-called quartz crystal z plate (z' plate) sliced out along a plane prescribed by the x-axis and the y'-axis and processed into the shape of a flat plate and having predetermined thickness t on the z'-axis orthogonal to this plane, as a base material, will be described, where the z'-axis is formed by tilting a z-axis by an angle of rotation $\phi$ (preferably $-5° \leq \phi \leq 15°$ so that a +z side rotates into a −y direction on a y-axis and where the y'-axis is formed by tilting the y-axis by the angle of rotation $\phi$ so that a +y side rotates into a +z direction on the z-axis, in an orthogonal coordinate system having the x-axis as an electrical axis, the y-axis as a mechanical axis, and the z-axis as an optical axis of quartz crystal which is a piezoelectric material used as a base material of an acceleration sensor. The z'-axis is an axis along a direction in which gravity acts in the acceleration sensors 118x, 118y, 118z.

First, the configuration of a sensor element 200 detecting acceleration will be described with reference to FIG. 13. The sensor element 200 has a substrate structure 201 including a base 210 or the like, an acceleration detection element 270 coupled to the substrate structure 201 and detecting a physical quantity, and mass elements 280, 282.

The substrate structure 201 of the sensor element 200 has the base 210, a moving element 214 coupled to the base 210 via a joint 212, a coupler 240, and a first support 220, a second support 230, a third support 250, and a fourth support 260 which are coupled to the base 210. The third support 250 and the fourth support 260 are coupled together on the side where the coupler 240 is arranged.

The substrate structure 201 uses a quartz crystal substrate made up of a quartz crystal z plate (z' plate) sliced out at a predetermined angle, as described above, from a quartz crystal ore as a piezoelectric material. The quartz crystal substrate is patterned to integrally form the components as the substrate structure 201. The patterning can use, for example, photolithography or wet etching.

The base 210 is coupled to the moving element 214 via the joint 212 and supports the moving element 214. The base 210 is coupled to the moving element 214 via the joint 212, to the coupler 240 located on the side opposite to the side where the joint 212 of the moving element is located, to the first support 220 and the second support 230, and to the third support 250 and the fourth support 260 coupled together on the side of the coupler 240.

The joint 212 is provided between the base 210 and the moving element 214 and is coupled to the base 210 and the moving element 214. The thickness (length along the z'-axis) of the joint 212 is thinner (shorter) than the thickness of the base 210 and the thickness of the moving element 214. The joint 212 is constricted as viewed in a cross-sectional view from the x-axis. The joint 212 is formed, for example, as a thin part with a thin thickness by so-called half-etching of the substrate structure 201 including the joint 212. The joint 212 has the function of an axis of rotation along the x-axis as a fulcrum (intermediate hinge) when the moving element 214 is displaced (pivots) about the base 210.

The moving element 214 is coupled to the base 210 via the joint 212. The moving element 214 is in the shape of a plate and has main surfaces 214a, 214b having a front-back relation with each other along the z'-axis. The moving element 214 is displaced along the axis (z'-axis) intersecting the main surfaces 214a, 214b about the joint 212 as the fulcrum (axis of rotation) in response to acceleration as a physical quantity applied on the axis (z'-axis) intersecting the main surfaces 214a, 214b.

The coupler 240 extends in such a way as to surround the moving element 214 along the x-axis from the base 210 on the +x side, where the third support 250, described later, is provided. The coupler 240 is coupled to the base 210 on the −x side, where the fourth support 260, described later, is provided.

The first support 220 and the second support 230 are provided, forming symmetry about the acceleration detection element 270. The third support 250 and the fourth support 260 are provided, forming symmetry about the acceleration detection element 270. At the first support 220, the second support 230, the third support 250, and the fourth support 260, the substrate structure 201 is supported to a fixing target element.

The acceleration detection element 270 is coupled to the base 210 and the moving element 214. In other words, the acceleration detection element 270 is provided extending over the base 210 and the moving element 214. The acceleration detection element 270 has vibrating beams 271a, 271b as vibrators, and a first base 272a and a second base 272b. In the acceleration detection element 270 having the first base 272a and the second base 272b coupled to the base 210, for example, as the moving element 214 is displaced in response to a physical quantity, a stress is generated in the vibrating beams 271a, 271b and physical quantity detection information generated in the vibrating beams 271a, 271b changes. In other words, the vibration frequency (resonance frequency) of the vibrating beams 271a, 271b changes. The acceleration detection element 270 in this embodiment is a dual tuning fork element (dual tuning fork-type vibration element) having the two vibrating beams 271a, 271b, the first base 272a, and the second base 272b. The vibrating beams 271a, 271b as vibrators may also be referred to as vibrating arms, vibrating beams, or columnar beams or the like.

For the acceleration detection element 270, a quartz crystal substrate made of a quartz crystal z plate (z' plate) sliced out at a predetermined angle from a quartz crystal ore or the like as a piezoelectric material, similarly to the foregoing substrate structure 201, is used. The acceleration detection element 270 is formed of the quartz crystal substrate patterned by photolithography or etching. Thus, the vibrating beams 271a, 271b, the first base 272a, and the second base 272b can be integrally formed.

The material of the acceleration detection element 270 is not limited to the quartz crystal substrate. As the material of the acceleration detection element 270, for example, a piezoelectric material such as lithium tantalate ($LiTaO_3$), lithium tetraborate ($Li_2B_4O_7$), lithium niobate ($LiNbO_3$), lead zirconate titanate (PZT), zinc oxide (ZnO), or aluminum nitride (AlN), or a semiconductor material such as silicon having a piezoelectric (piezoelectric material) coating such as zinc oxide (ZnO) or aluminum nitride (AlN) can be used. In this case, the same material may be preferably used for the substrate structure 201 and the acceleration detection element 270.

Although not illustrated or described, the acceleration detection element 270 may be provided with an extraction electrode or an excitation electrode.

The mass elements 280, 282 are provided on the main surface 214a of the moving element 214 and on the main surface 214b, which is the back face in the front-back relation with the main surface 214a. More specifically, the mass elements 280, 282 are provided over the main surfaces 214a, 214b via a mass joining member (not illustrated). The material of the mass elements 280, 282 can be, for example, a metal such as copper (Cu) or gold (Au).

In this embodiment, the vibrator of the acceleration detection element 270 is formed of a dual tuning fork vibrator (dual tuning fork-type vibration element) made up of the two columnar beams of the vibrating beams 271a, 271b. However, the vibrator can be made up of one columnar beam (single beam).

Next, the configuration of an acceleration detector 300 using the foregoing sensor element 200 for detecting acceleration will be described with reference to FIG. 14.

Figure 14:
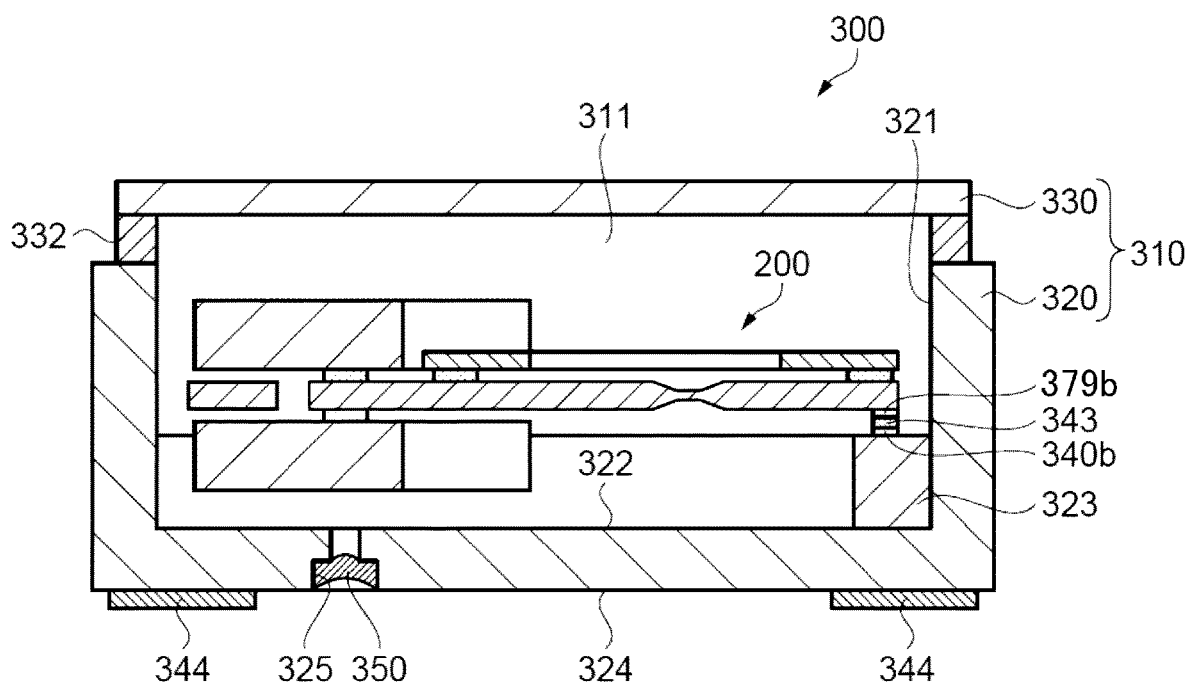
FIG. 14 is a cross-sectional view illustrating a schematic configuration of an acceleration detector using the acceleration sensor element.

As shown in FIG. 14, the foregoing sensor element 200 is installed in the acceleration detector 300. The acceleration detector 300 has the sensor element 200 and a package 310. The package 310 has a package base 320 and a lid 330. The sensor element 200 is accommodated in the package 310 of the acceleration detector 300. Specifically, the sensor element 200 is accommodated in a space 311 provided by the package base 320 and the lid 330 coupled to each other.

The package base 320 has a recess 321. The sensor element 200 is provided inside the recess 321. The shape of the package base 320 is not particularly limited, provided that the sensor element 200 can be accommodated inside the recess 321. The package base 320 in this embodiment can use a material such as ceramic, quartz crystal, glass or silicon.

The package base 320 has a step 323 protruding toward the lid 330 from an inner bottom surface 322, which is a bottom surface on the inner side of the recess of the package base 320. The step 323 is provided, for example, along the inner wall of the recess 321. A plurality of internal terminals 340b is provided on the step 323.

The internal terminal 340b is provided facing a position that overlaps a fixed part coupling terminal 379b provided at a fixed part of each of the first support 220, the second support 230, the third support 250, and the fourth support 260 of the sensor element 200, as viewed in a plan view. The internal terminal 340b is electrically coupled to the fixed part coupling terminal 379b, for example, using a silicone resin-based conductive adhesive 343 containing a conductive material such as a metal filler. The sensor element 200 is thus loaded in the package base 320 and accommodated inside the package 310.

In the package base 320, an external terminal 344 used to load the package on an external member is provided on an outer bottom surface 324, which is a surface opposite to the inner bottom surface 322. The external terminal 344 is electrically coupled to the internal terminal 340b via an internal wiring, not illustrated.

The internal terminal 340b and the external terminal 344 are made up of, for example, a multilayer metal film including a metalized layer of tungsten (W) or the like coated with nickel (Ni), gold (Au) or the like by plating or the like.

In the package base 320, a seal 350 sealing the inside of the package 310 is provided at a bottom part of the recess 321. The seal 350 is provided inside a penetration hole 325 formed in the package base 320. The penetration hole 325 penetrates the package base 320 from the outer bottom surface 324 to the inner bottom surface 322. In the example shown in FIG. 14, the penetration hole 325 has a stepped shape with the hole diameter on the side of the outer bottom surface 324 being larger than the hole diameter on the side of the inner bottom surface 322. The seal 350 is formed, for example, by arranging a sealant made up of an alloy of gold (Au) and germanium (Ge), or a solder or the like in the penetration hole 325, and heating and melting and then solidifying the sealant. The seal 350 is provided to airtightly seal the inside of the package 310.

The lid 330 is provided covering the recess 321 of the package base 320. The lid 330 is, for example, in the shape of a plate. For the lid 330, for example, the same material as the package base 320, an alloy of iron (Fe) and nickel (Ni), or a metal such as stainless steel can be used. The lid 330 is joined to the package base 320 via a lid joining member 332. As the lid joining member 332, for example, a seam ring, low-melting glass, inorganic adhesive or the like can be used.

After the lid 330 is joined to the package base 320, the sealant is arranged in the penetration hole 325 in the state where the pressure inside the package 310 is reduced (the degree of vacuum is high), and the sealant is heated and melted and subsequently solidified to provide the seal 350. Thus, the inside of the package 310 can be sealed airtightly. The inside of the package 310 may be filled with an inert gas such as nitrogen, helium, or argon.

In the acceleration detector 300, when a drive signal is provided to the excitation electrode of the sensor element 200 via the external terminal 344, the internal terminal 340b, the fixed part coupling terminal 379b or the like, the vibrating beams 271a, 271b of the sensor element 200 vibrate at a predetermined frequency. The acceleration detector 300 outputs the resonance frequency of the sensor element 200 changing according to the applied acceleration, as an output signal. The acceleration detector 300 can be used as the acceleration sensors 118x, 118y, 118z of the physical quantity sensor unit 100. The acceleration sensors 118x, 118y, 118z respectively output a measurement target signal with a frequency corresponding to the applied acceleration.

The physical quantity sensor unit 100 of the embodiment described above includes the resampling circuit configured to reduce a periodic noise generated in resampled measurement data, and therefore can detect a physical quantity with high accuracy.

Up to this point, the physical quantity sensor unit 100 having the acceleration sensors 118$x$, 118$y$, 118$z$ as physical quantity sensors is described as an example. However, a physical quantity sensor unit having a physical quantity sensor which detects at least one of mass, angular velocity, angular acceleration, electrostatic capacitance, and temperature as a physical quantity may be employed.

For a mass sensor which detects mass as a physical quantity, a quartz crystal vibrator microbalance method (QCM or quartz crystal microbalance) is known as a technique for measuring a very small mass change. Such a mass sensor utilizes the fact that the oscillation frequency of the quartz crystal vibrator decreases when the mass of matter adhering to the electrode surface of the quartz crystal vibrator increases, whereas the oscillation frequency increases when the mass of the adhering matter decreases. The detection sensitivity of the mass sensor as described above can be calculated by the Sauerbrey equation. For example, for an AT-cut quartz crystal vibrator with a fundamental frequency of 27 MHz, a decrease in frequency of 1 Hz corresponds to an increase in mass of 0.62 ng/cm$^2$ on the electrode surface.

An angular velocity sensor which detects angular velocity or angular acceleration as a physical quantity detects angular velocity, utilizing the fact that an object rotating at a constant angular velocity $\omega$ appears to be rotating at an angular velocity of "$\omega$-$\Omega$" when the object is observed from an observation point rotating at an angular velocity $\Omega$. Such an angular velocity sensor utilizes the fact that when a sensor element receives an angular acceleration in the state where a disc-shaped mass is electrostatically driven using an electrode and thus causes a wave having a natural frequency to circle, the apparent resonance frequency observed from the electrode changes. The angular velocity sensor as described above has no theoretical limitation on the bandwidth. Therefore, for example, higher accuracy of a technique for frequency measurement or a technique for non-linear correction directly leads to higher detection sensitivity.

An electrostatic capacitance sensor which detects electrostatic capacitance as a physical quantity causes RC oscillation using a reference resistance and a measurement target electrostatic capacitance and measures the oscillation frequency, and thus can measure the measurement target electrostatic capacitance. The electrostatic capacitance sensor utilizes the fact that when the measurement target electrostatic capacitance changes, a time constant provided by the RC changes and hence the oscillation frequency shifts. Also, the electrostatic capacitance sensor may be provided with a reference electrostatic capacitance separate from the measurement target electrostatic capacitance and thus may have a mechanism which causes RC oscillation using the reference resistance and the reference electrostatic capacitance, defines its frequency as a reference oscillation frequency, and detects the difference between the foregoing oscillation frequency and the reference oscillation frequency. This can eliminate various error factors.

A temperature sensor which detects temperature as a physical quantity causes RC oscillation using a thermistor and a reference electrostatic capacitance and measures the oscillation frequency, and thus can measure temperature. The temperature sensor utilizes the fact that when the resistance value of the thermistor changes, a time constant provided by the RC changes and hence the oscillation frequency shifts. Also, the temperature sensor may be provided with a reference resistor separate from the thermistor and thus may have a mechanism which causes RC oscillation using the reference resistance and the reference electrostatic capacitance, defines its frequency as a reference oscillation frequency, and detects the difference between the foregoing oscillation frequency and the reference oscillation frequency. This can eliminate various error factors.

The physical quantity sensor unit 100 having the physical quantity sensors for detecting various physical quantities as described above includes the resampling circuit 1 configured to reduce a periodic noise generated in resampled measurement data and therefore can detect a physical quantity with high accuracy.

3. Inertial Measurement Unit (IMU)

An inertial measurement unit according to this embodiment includes a physical quantity sensor which detects at least one of acceleration and angular velocity and which outputs a measurement target signal, a signal processing circuit which includes the resampling circuit 1 according to the foregoing embodiments and which processes a signal outputted from the physical quantity sensor, and a communication circuit which transmits inertial data resulting from the processing by the signal processing circuit, to outside. The inertial measurement unit transmits the inertial data synchronously with an external trigger supplied from an arithmetic processing device (host).

Figure 15:
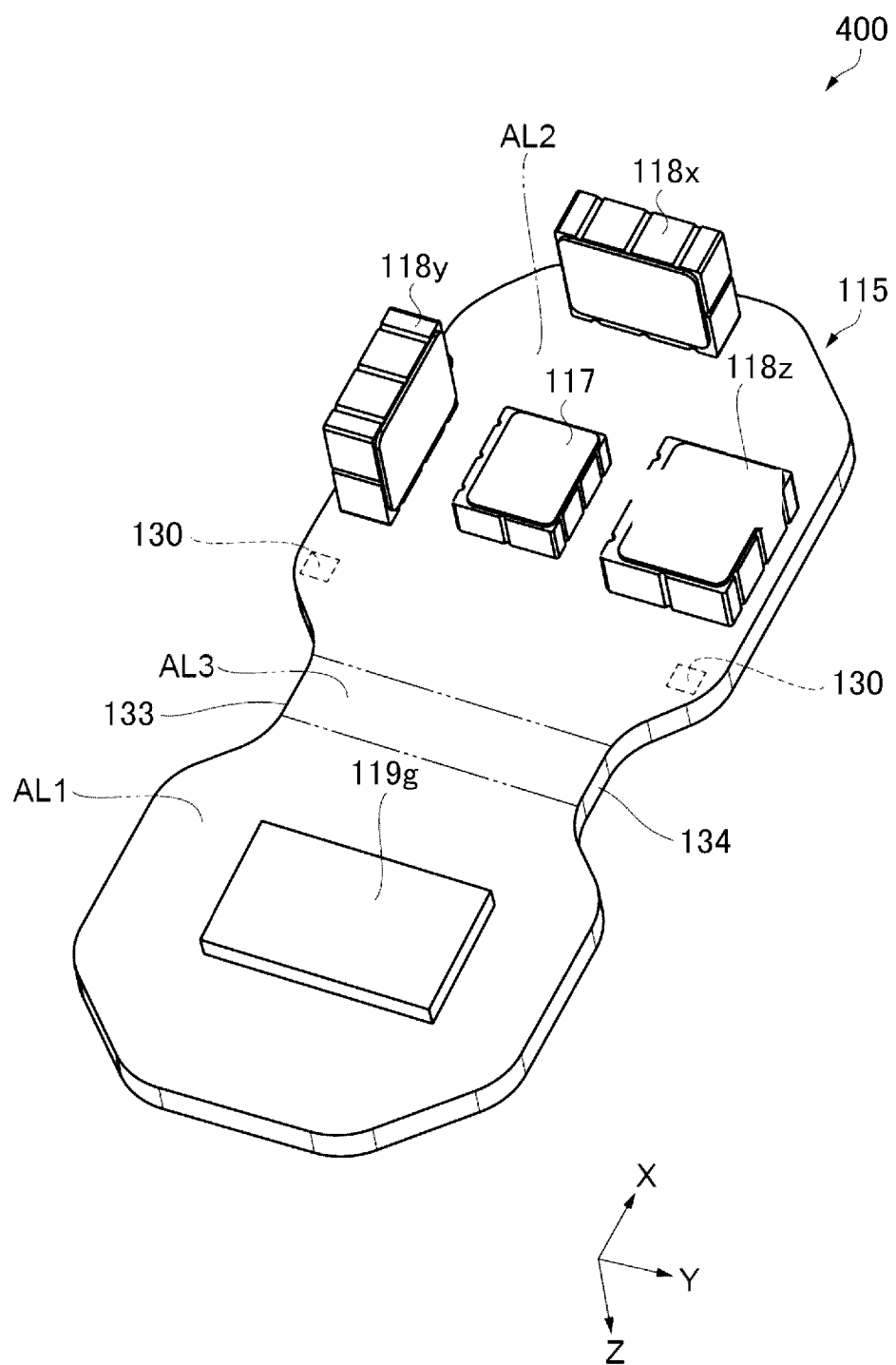
FIG. 15 is a perspective exterior view showing the configuration of a circuit board of an inertial measurement unit according to an embodiment.

The inertial measurement unit of this embodiment may have, for example, a structure similar to the physical quantity sensor unit 100 except that the components installed on the circuit board 115 are different. FIG. 15 is a perspective exterior view showing the configuration of a circuit board of an inertial measurement unit 400 of this embodiment. In FIG. 15, components similar to those in FIG. 12 are denoted by the same reference signs and will not be described repeatedly.

As shown in FIG. 15, the circuit board 115 provided in the inertial measurement unit 400 of this embodiment is divided into a first area AL1, a second area AL2, and a coupling area AL3 located between the first area AL1 and the second area AL2. On a first surface of the second area AL2 of the circuit board 115, three acceleration sensors 118$x$, 118$y$, 118$z$ configured to detect acceleration on one axis each and an angular velocity sensor 117 configured to detect angular velocity on three axes are installed. The angular velocity sensor 117, as a single device, can detect angular velocity on an X-axis, a Y-axis, and a Z-axis, that is, on three axes. The angular velocity sensor 117 may use, for example, a vibration gyro sensor made up of a silicon substrate processed by a MEMS technique so as to detect angular velocity, based on a Coriolis force applied to a vibrating object. Also, a control IC 119$g$ is installed on a first surface of the first area AL1 of the circuit board 115, and a plug-type (male) connector (not illustrated) is installed on a second surface having a front-back relation with the first surface of the first area AL1 of the circuit board 115.

The control IC 119$g$ as a processor is electrically coupled to the acceleration sensors 118$x$, 118$y$, 118$z$ and the angular velocity sensor 117 via a wiring, not illustrated. The control IC 119$g$ is a MCU and includes a signal processing circuit which processes an acceleration signal outputted from the acceleration sensors 118$x$, 118$y$, 118$z$ and an angular velocity signal outputted from the angular velocity sensor 117, a communication circuit which transmits inertial data resulting from the processing by the signal processing circuit, to outside, and a storage unit including a non-volatile memory, or the like. The signal processing circuit includes an A/D converter (equivalent to the A/D converter 2 described in the foregoing embodiments) to which an acceleration signal or an angular velocity signal as a measurement target signal is inputted, the resampling circuit 1 of one of the foregoing embodiments, and a digital processing circuit which performs various kinds of conversion and correction on measurement data outputted from the resampling circuit 1 and generates inertial data, or the like. The control IC 119g controls each part of the physical quantity sensor unit 100, generates inertial data synchronized with an external trigger, based on the acceleration signals outputted respectively from the acceleration sensors 118x, 118y, 118z and the angular velocity signal outputted from the angular velocity sensor 117, and generates packet data including the inertial data. In the storage unit, a program prescribing the order and content of detecting acceleration or angular velocity, a program for including the inertial data into the packet data, and accompanying data or the like are stored. Although not illustrated, a plurality of other electronic components or the like may be installed on the circuit board 115.

With such a configuration, the inertial measurement unit 400 can detect, for example, an attitude and behavior (amount of inertial motion) of a vehicle (installation target device) such as an automobile, agricultural machine (farm machine), construction machine (building machine), robot, and drone. The inertial measurement unit 400 functions as a so-called six-axis motion sensor having the acceleration sensors 118x, 118y, 118z for three axes and the angular velocity sensor 117 for three axes.

The inertial measurement unit 400 of this embodiment described above includes the resampling circuit configured to reduce a periodic noise generated in resampled measurement data and therefore can generate inertial data with high accuracy.

Although the inertial measurement unit 400 is described above as having an acceleration sensor and an angular velocity sensor, the inertial measurement unit 400 may have an angular velocity sensor without having an acceleration sensor, or may have an acceleration sensor without having an angular velocity sensor.

4. Structure Monitoring Device (SHM or Structure Health Monitoring)

Figure 16:
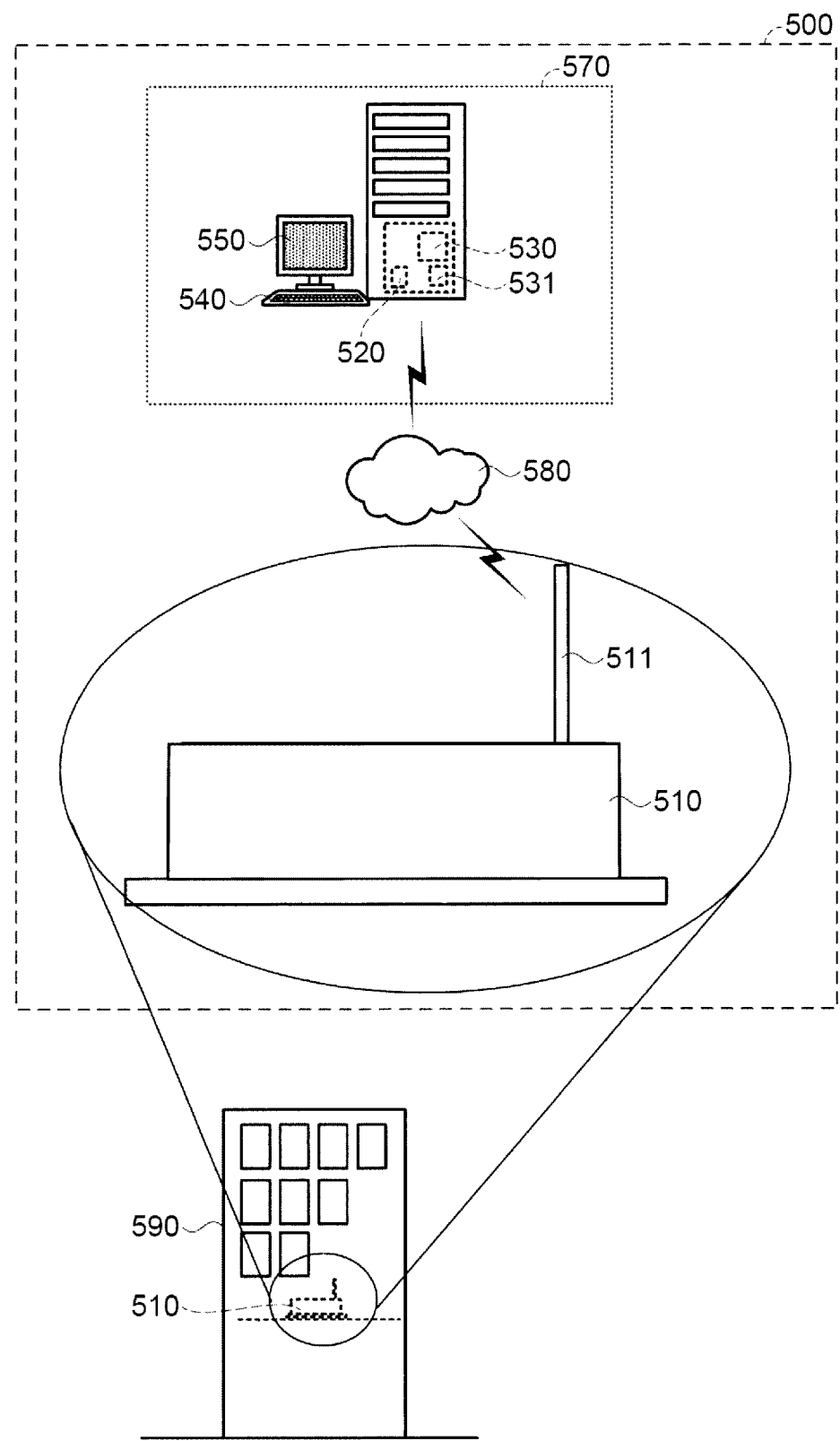
FIG. 16 shows the configuration of a structure monitoring device according to an embodiment.

FIG. 16 shows the configuration of a structure monitoring device according to this embodiment. As shown in FIG. 16, a structure monitoring device 500 according to this embodiment has a physical quantity sensor unit 510 which has the same functions as the physical quantity sensor unit 100 of the foregoing embodiments and which is installed in a structure 590 as a monitoring target. The physical quantity sensor unit 510 includes a transmitter 511 which transmits a detection signal. The transmitter 511 may be implemented as a communication module and antenna separate from the physical quantity sensor unit 510.

The physical quantity sensor unit 510 is coupled, for example, to a monitoring computer 570 via a wireless or wired communication network 580. The monitoring computer 570 has a receiver 520 coupled to the physical quantity sensor unit 510 via the communication network 580, and a calculator 530 which calculates an angle of inclination of the structure 590, based on a received signal outputted from the receiver 520.

The calculator 530 in this embodiment is implemented by an ASIC (application-specific integrated circuit) or FPGA (field-programmable gate array) or the like installed in a monitoring computer 570. However, the calculator 530 may be a processor such as a CPU (central processing unit), and the processor may arithmetically process a program stored in an IC memory 531, thus implementing a software-based configuration. The monitoring computer 570 can accept various operation inputs made by an operator via a keyboard 540 and display the result of arithmetic processing on a touch panel 550.

The structure monitoring device 500 of this embodiment monitors the inclination of the structure 590, using the physical quantity sensor unit 510 having the same functions as the physical quantity sensor unit 100 of the foregoing embodiments. Therefore, the structure monitoring device 500 can utilize the highly accurate detection of a physical quantity (acceleration, angular velocity or the like), which is an advantageous effect of the physical quantity sensor unit 100. Thus, the structure monitoring device 500 can accurately detect the inclination of the structure 590 as a monitoring target and can improve the monitoring quality for the structure 590.

The application of the present disclosure is not limited to the embodiments. Various changes can be made without departing from the scope and spirit of the present disclosure.

For example, while the resampling circuit 1 in the embodiments calculates the average value of AD data as a representative value of the AD data in the period of the external trigger, the resampling circuit 1 may calculate the median or mode of the AD data.

The foregoing embodiments and modifications are simply examples and are not limiting. For example, the embodiments and modifications can be suitably combined together.

The present disclosure includes a configuration substantially similar to any of the configurations described in the embodiments (for example, a configuration having the same function, method, and result, or a configuration having the same object and effect). The present disclosure also includes a configuration replacing a non-essential element of any of the configurations described in the embodiments. The present disclosure also includes a configuration having the same advantageous effect or achieving the same object as any of the configurations described in the embodiments. The present disclosure also includes a configuration including the related-art technique added to any of the configurations described in the embodiments.

What is claimed is:

1. A resampling circuit comprising:
   a first latch which measures first data updated in synchronization with a first clock signal; and
   a divider which (i) converts the measured first data into second data updated in synchronization with a second clock signal and (ii) outputs the second data, wherein
   the second clock signal is asynchronous with the first clock signal, and
   the second data is calculated with a time resolution of a third clock signal having a frequency higher than a frequency of the first clock signal and a frequency of the second clock signal.

2. The resampling circuit according to claim 1, wherein the second data is a representative value calculated by the divider based on the first data in a period of the second clock signal.

3. The resampling circuit according to claim 1, further comprising:
   a first accumulator which accumulates input data for each edge of the third clock signal;
   a second latch which captures and holds a value accumulated by the first accumulator for each edge of the second clock signal;

a second accumulator which accumulates a number of edges of the third clock signal; and a third latch which captures and holds a value accumulated by the second accumulator for each edge of the second clock signal, wherein the divider calculates a representative value of the first data by dividing the first data accumulated by the first accumulator and the second latch with a period of the second clock signal measured by the second accumulator and the third latch.

4. The resampling circuit according to claim 3, wherein the input data is a data held by the first latch.

5. The resampling circuit according to claim 3, further comprising:

a fourth latch which captures and holds the first data for each edge of the second clock signal; and a subtractor which subtracts the data held by the first latch from the value of the data held by the fourth latch, wherein the input data is a value output from the subtractor.

6. The resampling circuit according to claim 3, further comprising:

an AND circuit which receives an initial reset signal and the second clock signal and outputs an AND signal of the initial reset signal and the second clock signal;

a delay circuit which outputs a data obtained by delaying the second data by one cycle of the second clock signal;

an adder which adds the data output from the delay circuit and the value output from the divider;

a resetter which replaces the value output from the adder with zero when the AND signal output from the AND circuit is at a high level; and a subtractor which uses the second data as a reference value and measures a difference between the reference value and the data held by the first latch with the third clock signal, wherein the divider divides a difference accumulated by the first accumulator and the second latch by a period of the second clock signal measured by the second accumulator and the third latch.

7. The resampling circuit according to claim 3, wherein the resampling circuit initializes the representative value of the first data.

8. The resampling circuit according to claim 3, wherein the representative value of the first data is one of an average value, a median value, and a mode value.

9. The resampling circuit according to claim 3, further comprising:

a low-pass filter which outputs the first data, wherein a cutoff frequency of the low-pass filter is lower than a Nyquist frequency of the second clock signal.

10. The resampling circuit according to claim 1, wherein the first clock signal is a sampling clock for analog to digital conversion.

11. The resampling circuit according to claim 1, wherein the second clock signal is an external trigger signal received at the resampling circuit.

12. A physical quantity sensor unit comprising:

the resampling circuit according to claim 1; and a physical quantity sensor.

13. The physical quantity sensor unit according to claim 12, wherein the physical quantity sensor detects at least one of acceleration and angular velocity.

14. A physical quantity sensor unit comprising:

a physical quantity sensor which detects at least one of acceleration and angular velocity;

a signal processing circuit which includes the resampling circuit according to claim 1 and processes a signal outputted from the physical quantity sensor; and a communication circuit which transmits, external to the physical quantity sensor unit, inertial data generated by the signal processing circuit.

15. A structure monitoring device comprising:

the physical quantity sensor unit according to claim 14;

a receiver which receives a detection signal from the physical quantity sensor unit installed on a structure; and a calculator which calculates a tilt angle of the structure based on a signal output from the receiver.

16. A resampling circuit comprising:

a low-pass filter which filters first data updated in synchronization with a first clock signal;

a divider which converts the filtered first data into second data updated in synchronization with a second clock signal and outputs the second data;

an OR circuit which outputs an OR signal of the second clock signal and the first clock signal;

a third accumulator which accumulates a number of edges of a third clock signal having a frequency higher than a frequency of the first clock signal and a frequency of the second clock signal;

a fourth latch which captures and holds a value accumulated by the third accumulator for each edge of the OR signal output from the OR circuit;

a subtractor which subtracts the filtered first data from the second data;

a multiplier which multiplies the value output from the subtractor with the value held by the fourth latch;

a first accumulator which accumulates the value output from the multiplier for each edge of the OR signal;

a second latch which captures and holds the value accumulated by the first accumulator for each edge of the second clock signal;

a second accumulator which accumulates the number of edges of the third clock signal; and a third latch which captures and holds the value accumulated by the second accumulator for each edge of the second clock signal, wherein the second clock signal is asynchronous with the first clock signal, and the second data is calculated with a time resolution of the third clock signal.

17. A resampling circuit comprising:

a low-pass filter which filters first data updated in synchronization with a first clock signal;

a first divider which converts the filtered first data into second data updated in synchronization with a second clock signal and outputs the second data;

a third accumulator which accumulates a number of edges of a third clock signal having a frequency higher than a frequency of the first clock signal and a frequency of the second clock signal;

a OR circuit which outputs an OR signal of the second clock signal and the first clock signal; and a fourth latch which captures and holds a value accumulated by the third accumulator for each edge of the OR signal output from the OR circuit;

a fourth accumulator which accumulates the number of edges of a third clock signal having a frequency higher than a frequency of the first clock signal and a frequency of the second clock signal;

a fifth latch which captures and holds a value accumulated by the fourth accumulator for each edge of the first clock signal;

a second divider which divides a value held by the fourth latch by the value held by the fifth latch;

a second accumulator which accumulates the value output from the second divider for each edge of the OR signal;

a third latch which captures and holds the value accumulated by the second accumulator for each edge of the second clock signal;

a subtractor which subtracts the filtered first data from the second data;

a multiplier which multiplies together the value output from the subtractor and the value output from the second divider;

a first accumulator which accumulates the value output from the multiplier for each edge of the OR signal, and a second latch which captures and holds a value accumulated by the first accumulator for each edge of the second clock signal; and a third latch which captures and holds a value accumulated by the second accumulator for each edge of the second clock signal, wherein the second clock signal is asynchronous with the first clock signal, the second data is calculated with a time resolution of the third clock signal, and the first divider divides the multiplication value accumulated by the first accumulator and the second latch by a ratio accumulated by the second accumulator and the third latch.

18. The resampling circuit according to claim 17, wherein using the second data as a reference value, the second divider calculates a ratio of a period measured by the third accumulator and the fourth latch and a period of the first clock signal measured by the fourth accumulator and the fifth latch, the second accumulator and the third latch accumulate a ratio by a period of the second clock signal, the multiplier multiplies together a ratio and a difference between the reference value calculated by the subtractor and the first clock signal, the first accumulator and the second latch accumulate a multiplication value of the ratio and the difference by a period of the second clock signal, the first divider divides the multiplication value accumulated by the first accumulator and the second latch by a ratio accumulated by the second accumulator and the third latch and calculates an average value of the difference, and a representative value of the first data is calculated by adding the reference value and the average value.

* * * * *